US012052196B2

(12) United States Patent
Wu et al.

(10) Patent No.: US 12,052,196 B2
(45) Date of Patent: Jul. 30, 2024

(54) METHOD AND DEVICE IN COMMUNICATION NODE USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/231,250

(22) Filed: Aug. 8, 2023

(65) Prior Publication Data

US 2023/0379124 A1 Nov. 23, 2023

Related U.S. Application Data

(63) Continuation of application No. 16/924,230, filed on Jul. 9, 2020, now Pat. No. 11,770,229.

(30) Foreign Application Priority Data

Jul. 20, 2019 (CN) .......................... 201910657779.7

(51) Int. Cl.
*H04L 5/00* (2006.01)
*H04W 72/0446* (2023.01)
*H04W 72/0453* (2023.01)

(52) U.S. Cl.
CPC .......... *H04L 5/0053* (2013.01); *H04L 5/0005* (2013.01); *H04L 5/0094* (2013.01); *H04W 72/0446* (2013.01); *H04W 72/0453* (2013.01)

(58) Field of Classification Search
CPC ... H04L 5/0053; H04L 5/0005; H04L 5/0094; H04W 72/0446; H04W 72/0453
See application file for complete search history.

(56) References Cited

U.S. PATENT DOCUMENTS

2014/0286270 A1* 9/2014 Karsi .................... H04W 16/32
370/329
2019/0261361 A1* 8/2019 Xiong .................... H04W 72/02
(Continued)

FOREIGN PATENT DOCUMENTS

WO WO-2014022769 A1 * 2/2014 ........... H04B 1/7143

OTHER PUBLICATIONS

3GPP TSG-RAN WG4 Meeting#99-e, R4-2110566 Title: CR to TS38.141-1:cleanup of BS conformance testing for URLLC demodulation requirements with higher BLER (Year: 2021).*
(Continued)

*Primary Examiner* — Faruk Hamza
*Assistant Examiner* — Abusayeed M Haque

(57) ABSTRACT

The disclosure provides a method and device in communication node used for wireless communication. A first node receives a first signaling, the first signaling being used for indicating a first time-frequency resource group and the first time-frequency resource group being reserved for a first bit block, receives a second signaling, the second signaling being used for determining a second time-frequency resource group and the second time-frequency resource group being reserved for a second bit block, transmits the first bit block in time-frequency resources in the first time-frequency resource group other than a first resource subgroup, and transmits the second bit block in the second time-frequency resource group. The first time-frequency resource group and the second time-frequency resource group are partially overlapping; the first signaling is used for
(Continued)

determining a first index group, and the second signaling is used for determining a second index group.

20 Claims, 11 Drawing Sheets

(56) References Cited

U.S. PATENT DOCUMENTS

| | | | | |
|---|---|---|---|---|
| 2019/0313419 | A1* | 10/2019 | Fakoorian | H04W 28/0278 |
| 2019/0394758 | A1* | 12/2019 | Cheng | H04W 24/08 |
| 2020/0374055 | A1* | 11/2020 | Baldemair | H04L 5/0053 |
| 2020/0374065 | A1* | 11/2020 | Baldemair | H04L 5/0053 |
| 2020/0374066 | A1* | 11/2020 | Baldemair | H04L 27/2647 |
| 2020/0374080 | A1* | 11/2020 | Baldemair | H04L 5/0051 |

OTHER PUBLICATIONS

3GPP TSG-RAN WG1 Meeting#92Bis, R1-1805643 Title:Summary of discussion on mobility evaulation method and parameters (Year: 2018).*

3GPP TSG-RAN WG1 Meeting 91, R1-1719399 Title:Soft buffer management in NR and LTE-NR DC (Year: 2017).*

* cited by examiner

First index group and second index group belong to two of K index sets respectively First index group and second index group belong to one same index set among K index sets Target BLER of first MCS set is greater than target BLER of second MCS set

METHOD AND DEVICE IN COMMUNICATION NODE USED FOR WIRELESS COMMUNICATION

CROSS REFERENCE TO RELATED APPLICATIONS

This application is the U.S. patent application Ser. No. 16/924,230, filed on Jul. 9,2020, which claims the priority benefit of Chinese Patent Application No. 201910657779.7, filed on Jul. 20, 2019, the full disclosure of which is incorporated herein by reference.

BACKGROUND

Technical Field

The disclosure relates to transmission methods and devices in wireless communication systems, and in particular to a transmission method and device for sidelink in wireless communication.

Related Art

In 5G NR (New Radio) systems, both base stations and terminal equipment will be configured with multiple antenna panels. NR Rel-16 standards already enable base stations to perform simultaneous transmissions of radio signals through multiple panels; however, a terminal equipment, even if configured with multiple panels, only supports transmissions selected based on a panel, that is to say, it is allowed to perform radio transmissions on one panel only at a same time. In future evolution of 5G NR systems, in order to improve system capacity, one important development direction is to enable the terminal equipment to transmit radio signals simultaneously on multiple panels.

SUMMARY

Existing 5G NR systems only support transmissions selected based on a panel, and one terminal equipment is not allowed to perform multiple concurrent radio transmissions on one BWP. In future evolution of 5G NR systems, a terminal equipment can transmit radio signals on multiple panels simultaneously; therefore, the design for multiple concurrent radio transmissions needs to be studied again.

In view of the above problems, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a first node for wireless communication, wherein the method includes:

receiving a first signaling, the first signaling being used for indicating a first time-frequency resource group and the first time-frequency resource group being reserved for a first bit block;

receiving a second signaling, the second signaling being used for determining a second time-frequency resource group and the second time-frequency resource group being reserved for a second bit block; and transmitting the first bit block in time-frequency resources in the first time-frequency resource group other than a first resource subgroup; and transmitting the second bit block in the second time-frequency resource group.

Herein, the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one embodiment, the problem to be solved by the disclosure is that: in the condition that multiple antenna panels are configured, when time-frequency resources scheduled to two radio transmissions respectively are overlapping, how to determine the time-frequency resources actually occupied by the two radio transmissions according to the transmitting antenna panels of the two radio transmissions is a key problem to be solved.

In one embodiment, the essence of the above method is that: the first time-frequency resource group and the second time-frequency resource group are the time-frequency resources scheduled to two radio transmissions (for example, two PUSCHs, or a PUSCH and a PUCCH) respectively, the first resource subgroup is the time-frequency resources that one radio transmission actually needs to avoid, and the K index sets correspond to K antenna panels respectively; the first resource subgroup is determined according to whether the transmitting antenna panels of the two radio transmissions are the same. The above method has the following benefits: the factor of antenna panels is taken into account when solving the problem that the time-frequency resources of two radio transmissions are overlapping; the transmission reliability of two radio transmissions is guaranteed to the greatest extent when reducing interferences between the two radio transmissions as far as possible; therefore, system capacity is improved.

According to one aspect of the disclosure, the above method is characterized in that: when the first index group and the second index group belong to two index sets among the K index sets respectively, the first resource subgroup includes all time-frequency resources in the first time-frequency resource group that are overlapping with time-frequency resources occupied by the second time-frequency resource group.

In one embodiment, the essence of the above method is that: when transmitting antenna panels of two radio transmissions are different, one radio transmission needs to avoid the time-frequency resources overlapping with the time-frequency resources of the other radio transmission. The above method has the following benefits: interferences between two radio transmissions are avoided, the transmission reliability of two radio transmissions is guaranteed to the greatest extent, and system capacity is improved.

According to one aspect of the disclosure, the above method is characterized in that: when the first index group and the second index group belong to one same index set among the K index sets, the first resource subgroup includes all time-frequency resources in the first time-frequency resource group that are overlapping in time domain with the second time-frequency resource group.

In one embodiment, the essence of the above method is that: when transmitting antenna panels of two radio transmissions are the same, one radio transmission needs to avoid the time-frequency resources overlapping in time domain with the time-frequency resources of the other radio transmission. The above method has the following benefits: interferences between two radio transmissions are avoided, the transmission reliability of two radio transmissions is guaranteed to the greatest extent, and system capacity is improved.

According to one aspect of the disclosure, the above method is characterized in that: time-frequency resources occupied by the first signaling and time-frequency resources occupied by the second signaling belong to two of N time-frequency resource sets respectively, any two of the N time-frequency resource sets are orthogonal, and N is a positive integer greater than 1; or the first signaling is used for determining a first MCS set, the second signaling is used for determining a second MCS set, and a target BLER of the first MCS set is greater than a target BLER of the second MCS set.

In one embodiment, the essence of the above method is that: the first signaling and the second signaling come from two Transmit-Receive Points (TRPs) respectively.

In one embodiment, the essence of the above method is that: the second signaling schedules transmissions of Ultra Reliable and Low Latency Communication (URLLC) services, the first signaling schedules transmissions of Enhance Mobile Broadband (eMBB) services, and a transmitting priority of the second bit block is higher than a transmitting priority of the first bit block.

According to one aspect of the disclosure, the above method includes:

receiving first information.

Herein, the first information is used for determining the K index sets.

According to one aspect of the disclosure, the above method includes:

transmitting second information.

Herein, the second information is used for indicating the K.

According to one aspect of the disclosure, the above method includes:

receiving a first radio signal.

Herein, the second signaling is used for determining time-frequency resources occupied by the first radio signal, and the second bit block is related to the first radio signal.

The disclosure provides a method in a second node for wireless communication, wherein the method includes:

transmitting a first signaling, the first signaling being used for indicating a first time-frequency resource group and the first time-frequency resource group being reserved for a first bit block;

transmitting a second signaling, the second signaling being used for determining a second time-frequency resource group and the second time-frequency resource group being reserved for a second bit block;

receiving the first bit block in time-frequency resources in the first time-frequency resource group other than a first resource subgroup; and receiving the second bit block in the second time-frequency resource group.

Herein, the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

According to one aspect of the disclosure, the above method is characterized in that: when the first index group and the second index group belong to two index sets among the K index sets respectively, the first resource subgroup includes all time-frequency resources in the first time-frequency resource group that are overlapping with time-frequency resources occupied by the second time-frequency resource group.

According to one aspect of the disclosure, the above method is characterized in that: when the first index group and the second index group belong to one same index set among the K index sets, the first resource subgroup includes all time-frequency resources in the first time-frequency resource group that are overlapping in time domain with the second time-frequency resource group.

According to one aspect of the disclosure, the above method is characterized in that: time-frequency resources occupied by the first signaling and time-frequency resources occupied by the second signaling belong to two of N time-frequency resource sets respectively, any two of the N time-frequency resource sets are orthogonal, and N is a positive integer greater than 1; or the first signaling is used for determining a first MCS set, the second signaling is used for determining a second MCS set, and a target BLER of the first MCS set is greater than a target BLER of the second MCS set.

According to one aspect of the disclosure, the above method includes:

transmitting first information.

Herein, the first information is used for determining the K index sets.

According to one aspect of the disclosure, the above method includes:

receiving second information.

Herein, the second information is used for indicating the K.

According to one aspect of the disclosure, the above method includes:

transmitting a first radio signal.

Herein, the second signaling is used for determining time-frequency resources occupied by the first radio signal, and the second bit block is related to the first radio signal.

The disclosure provides a first node for wireless communication, wherein the first node includes:

a first receiver, to receive a first signaling, the first signaling being used for indicating a first time-frequency resource group and the first time-frequency resource group being reserved for a first bit block, and to receive a second signaling, the second signaling being used for determining a second time-frequency resource group and the second time-frequency resource group being reserved for a second bit block; and a first transmitter, to transmit the first bit block in time-frequency resources in the first time-frequency resource group other than a first resource subgroup, and to transmit the second bit block in the second time-frequency resource group.

Herein, the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

The disclosure provides a second node for wireless communication, wherein the second node includes:

a second transmitter, to transmit a first signaling, the first signaling being used for indicating a first time-frequency resource group and the first time-frequency resource group being reserved for a first bit block, and to transmit a second signaling, the second signaling being used for determining a second time-frequency resource group and the second time-frequency resource group being reserved for a second bit block; and a second receiver, to receive the first bit block in time-frequency resources in the first time-frequency resource group other than a first resource subgroup, and to receive the second bit block in the second time-frequency resource group.

Herein, the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one embodiment, the method in the disclosure has the following advantages.

The disclosure provides a solution for the following problem: in the condition that multiple antenna panels are configured, when time-frequency resources scheduled to two radio transmissions respectively are overlapping, how to determine the time-frequency resources actually occupied by the two radio transmissions according to the transmitting antenna panels of the two radio transmissions.

In the method mentioned in the disclosure, the factor of antenna panels is taken into account when solving the problem that the time-frequency resources of two radio transmissions are overlapping; the transmission reliability of two radio transmissions is guaranteed to the greatest extent when reducing interferences between the two radio transmissions as far as possible; therefore, system capacity is improved.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in also detail in conjunction with the drawings. It should be noted that the embodiments in the disclosure and the characteristics of the embodiments may be mutually combined arbitrarily if no conflict is incurred.

Embodiment 1

Figure 1:
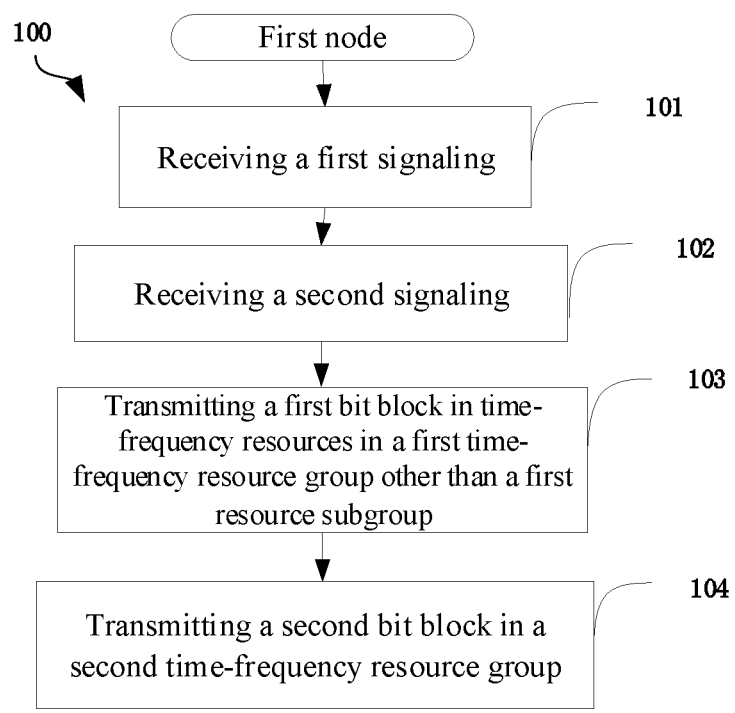
FIG. 1 is a flowchart of a first signaling, a second signaling, a first bit block and a second bit block according to one embodiment of the disclosure.

Embodiment 1 illustrates a flowchart of a first signaling, a second signaling, a first bit block and a second bit block according to one embodiment of the disclosure, as shown in FIG. 1. In FIG. 1, each box represents one step. It should be noted that the order of each box shown in FIG. 1 does not represent a time sequence between the steps shown in FIG. 1.

In Embodiment 1, the first node in the disclosure receives a first signaling in S101, the first signaling being used for indicating a first time-frequency resource group and the first time-frequency resource group being reserved for a first bit block, receives a second signaling in S102, the second signaling being used for determining a second time-frequency resource group and the second time-frequency resource group being reserved for a second bit block, transmits the first bit block in time-frequency resources in the first time-frequency resource group other than a first resource subgroup in S103, and transmits the second bit block in the second time-frequency resource group in S104; wherein the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one embodiment, the first signaling is configured dynamically.

In one embodiment, the first signaling is a physical layer signaling.

In one embodiment, the first signaling is a DCI signaling.

In one embodiment, the first signaling is a DCI signaling for uplink grant.

In one embodiment, the first signaling is transmitted on a downlink physical layer control channel (that is, a downlink channel capable of carrying physical layer signalings only).

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a Narrow Band PDCCH (NB-PDCCH).

In one embodiment, the first signaling is a DCI format 0_0, and the specific definition of the DCI format 0_0 can refer to Chapter 7.3.1.1 in 3GPP TS38.212.

In one embodiment, the first signaling is a DCI format 0_1, and the specific definition of the DCI format 0_1 can refer to Chapter 7.3.1.1 in 3GPP TS38.212.

In one embodiment, the first signaling indicates explicitly a first time-frequency resource group.

In one embodiment, the first signaling indicates implicitly a first time-frequency resource group.

In one embodiment, the first signaling indicates directly a first time-frequency resource group.

In one embodiment, the first signaling indicates indirectly a first time-frequency resource group.

In one embodiment, the first signaling includes a first field and a second field, the first field included in the first signaling is used for indicating time domain resources occupied by the first time-frequency resource group, and the second field included in the first signaling is used for indicating frequency domain resources occupied by the first time-frequency resource group.

In one subembodiment, the first field included in the first signaling is a time domain resource assignment field, the second field included in the first signaling is a frequency domain resource assignment field, and the specific definitions of the time domain resource assignment field and the frequency domain resource assignment field can refer to Chapter 6.1.2 in 3GPP TS38.214.

In one embodiment, the first signaling is used for indicating scheduling information of the first bit block.

In one embodiment, the scheduling information of the first bit block includes at least one of occupied time domain resources, occupied frequency domain resources, a Modulation and Coding Scheme (MCS), DeModulation Reference Signal (DMRS) configuration information, a HARQ process number, a Redundant Version (RV), a New Data Indicator (NDI), a transmitting antenna port, corresponding multiantenna related transmitting and corresponding multiantenna related receiving.

In one subembodiment, the occupied time domain resources included in the scheduling information of the first bit block are time domain resources occupied by the first time-frequency resource group.

In one subembodiment, the occupied frequency domain resources included in the scheduling information of the first bit block are frequency domain resources occupied by the first time-frequency resource group.

In one subembodiment, the DMRS configuration information included in the scheduling information of the first bit block includes at least one of an RS sequence, a mapping mode, a DMRS type, occupied time domain resources, occupied frequency domain resources, occupied code domain resources, a cyclic shift and an OCC.

In one embodiment, the first time-frequency resource group includes a positive integer number of multicarrier symbol(s) in time domain.

In one embodiment, the first time-frequency resource group includes a positive integer number of subcarrier(s) in frequency domain.

In one embodiment, the first time-frequency resource group includes a positive integer number of Resource Block (s) (RB(s)) in frequency domain.

In one embodiment, the first time-frequency resource group includes a positive integer number of Resource Element(s) (RE(s)).

In one embodiment, the first time-frequency resource group is time-frequency resources allocated to an Uplink Shared Channel (UL-SCH).

In one embodiment, the first time-frequency resource group is time-frequency resources allocated to an uplink physical layer data channel (that is, an uplink channel capable of carrying physical layer data).

In one subembodiment, the uplink physical layer data channel is a Physical Uplink Shared Channel (PUSCH).

In one subembodiment, the uplink physical layer data channel is a short PUSCH (sPUSCH).

In one subembodiment, the uplink physical layer data channel is a Narrow Band PUSCH (NB-PUSCH).

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol includes a Cyclic Prefix (CP).

In one embodiment, the first time-frequency resource group is reserved for transmitting a first bit block.

In one embodiment, the first bit block includes a positive integer number of Transport Block(s) (TB(s)).

In one embodiment, the first bit block includes one TB.

In one embodiment, the second signaling is configured dynamically.

In one embodiment, the second signaling is a physical layer signaling.

In one embodiment, the second signaling is a DCI signaling.

In one embodiment, the second signaling is a DCI signaling for downlink grant.

In one embodiment, the second signaling is a DCI signaling for uplink grant.

In one embodiment, the second signaling is transmitted on a downlink physical layer control channel (that is, a downlink channel capable of carrying physical layer signalings only).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the first signaling is a DCI format 1_0, and the specific definition of the DCI format 1_0 can refer to Chapter 7.3.1.2 in 3GPP TS38.212.

In one embodiment, the first signaling is a DCI format 1_1, and the specific definition of the DCI format 1_1 can refer to Chapter 7.3.1.2 in 3GPP TS38.212.

In one embodiment, the second signaling is a DCI format 0_0, and the specific definition of the DCI format 0_0 can refer to Chapter 7.3.1.1 in 3GPP TS38.212.

In one embodiment, the second signaling is a DCI format 0_1, and the specific definition of the DCI format 0_1 can refer to Chapter 7.3.1.1 in 3GPP TS38.212.

In one embodiment, the second time-frequency resource group includes a positive integer number of multicarrier symbol(s) in time domain.

In one embodiment, the second time-frequency resource group includes a positive integer number of subcarrier(s) in frequency domain.

In one embodiment, the second time-frequency resource group includes a positive integer number of RB(s) in frequency domain.

In one embodiment, the second time-frequency resource group includes a positive integer number of RE(s).

In one embodiment, the second time-frequency resource group is time-frequency resources allocated to a PUSCH.

In one embodiment, the second time-frequency resource group is time-frequency resources allocated to a Physical Uplink Shared CHannel (PUCCH).

In one embodiment, the second time-frequency resource group is reserved for transmitting a second bit block.

In one embodiment, the second signaling is used for indicating the second time-frequency resource group.

In one embodiment, the second signaling indicates explicitly the second time-frequency resource group.

In one embodiment, the second signaling indicates implicitly the second time-frequency resource group.

In one embodiment, the second signaling indicates directly the second time-frequency resource group.

In one embodiment, the second signaling indicates indirectly the second time-frequency resource group.

In one embodiment, the second signaling includes a first field and a second field, the first field included in the second signaling is used for indicating time domain resources occupied by the second time-frequency resource group, and the second field included in the second signaling is used for indicating frequency domain resources occupied by the second time-frequency resource group.

In one subembodiment, the first field included in the second signaling is a time domain resource assignment field, the second field included in the second signaling is a frequency domain resource assignment field, and the specific definitions of the time domain resource assignment field and the frequency domain resource assignment field can refer to Chapter 6.1.2 in 3GPP TS38.214.

In one embodiment, the second signaling includes a first field, and the first field included in the second signaling is used for determining the second time-frequency resource group.

In one subembodiment, the first field included in the second signaling includes a positive integer number of bit(s).

In one subembodiment, the first field included in the second signaling is used for determining the second time-frequency resource group from a second time-frequency resource set, the second time-frequency resource set includes a positive integer number of time-frequency resource group(s), and the second time-frequency resource group is one time-frequency resource group in the second time-frequency resource set.

In one subembodiment, the first field included in the second signaling indicates an index of the second time-frequency resource group in a second time-frequency resource set, the second time-frequency resource set includes a positive integer number of time-frequency resource group(s), and the second time-frequency resource group is one time-frequency resource group in the second time-frequency resource set.

In one subembodiment, the first field included in the second signaling is a PUCCH resource indicator, and the specific definition of the PUCCH resource indicator can refer to Chapter 9.2.3 in 3GPP TS38.213.

In one subembodiment, the first field included in the second signaling is used for indicating a first report configuration from multiple report configurations, and the first report configuration includes the second time-frequency resource group.

In one subembodiment, the first field included in the second signaling is used for indicating an index of a first report configuration in multiple report configurations, and the first report configuration includes the second time-frequency resource group.

In one subembodiment, the first field included in the second signaling is a CSI request, and the specific definition of the CSI request field can refer to Chapter 7.3.1.1 in 3GPP TS38.212.

In one embodiment, the second signaling is used for indicating scheduling information of the second bit block.

In one embodiment, the scheduling information of the second bit block includes at least one of occupied time domain resources, occupied frequency domain resources, an MCS, DMRS configuration information, a HARQ process number, an RV, a NDI, a transmitting antenna port, corresponding multiantenna related transmitting and corresponding multiantenna related receiving.

In one subembodiment, the second bit block includes a positive integer number of TB(s).

In one subembodiment, the second bit block includes one TB.

In one subembodiment, the occupied time domain resources included in the scheduling information of the second bit block are time domain resources occupied by the second time-frequency resource group.

In one subembodiment, the occupied frequency domain resources included in the scheduling information of the second bit block are frequency domain resources occupied by the second time-frequency resource group.

In one subembodiment, the DMRS configuration information included in the scheduling information of the second bit block includes at least one of an RS sequence, a mapping mode, a DMRS type, occupied time domain resources, occupied frequency domain resources, occupied code domain resources, a cyclic shift and an OCC.

In one embodiment, the second bit block includes a positive integer number of TB(s).

In one embodiment, the second bit block includes one TB.

In one embodiment, the second bit block includes Uplink Control Information (UCI).

In one subembodiment, the UCI includes a Hybrid Automatic Repeat reQuest ACKnowledgement (HARQ-ACK).

In one subembodiment, the UCI includes Channel State Information (CSI).

In one subembodiment, the UCI includes at least one of a HARQ-ACK and a CSI.

In one embodiment, the first resource subgroup includes a positive integer number of multicarrier symbol(s) in time domain.

In one embodiment, the first resource subgroup includes a positive integer number of subcarrier(s) in frequency domain.

In one embodiment, the first resource subgroup includes a positive integer number of RB(s) in frequency domain.

In one embodiment, the first resource subgroup includes a positive integer number of RE(s).

In one embodiment, the first time-frequency resource group includes time-frequency resources other than the second time-frequency resource group.

In one embodiment, the second time-frequency resource group includes time-frequency resources other than the first time-frequency resource group.

In one embodiment, time-frequency resources occupied by the second time-frequency resource group all belong to time-frequency resources occupied by the first time-frequency resource group.

In one embodiment, the first time-frequency resource group also includes time-frequency resources other than the first resource subgroup.

In one embodiment, a number of REs included in the first time-frequency resource group is greater than a number of REs included in the first resource subgroup.

Embodiment 2

Figure 2:
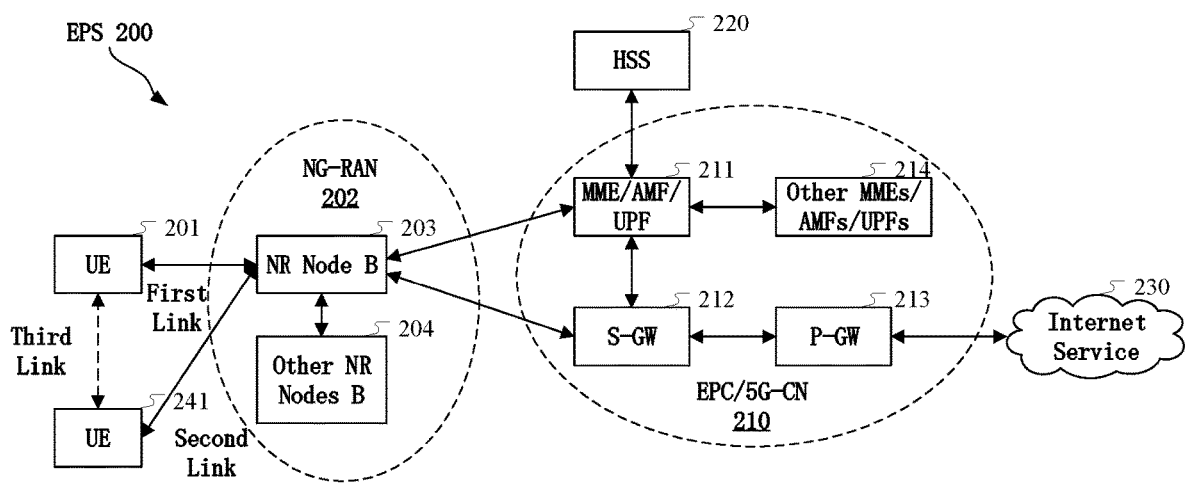
FIG. 2 is a diagram illustrating a network architecture according to one embodiment of the disclosure.

Embodiment 2 illustrates a diagram of a network architecture according to the disclosure, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the UE 241 corresponds to the second node in the disclosure.

In one embodiment, the gNB 203 corresponds to the second node in the disclosure.

Embodiment 3

Figure 3:
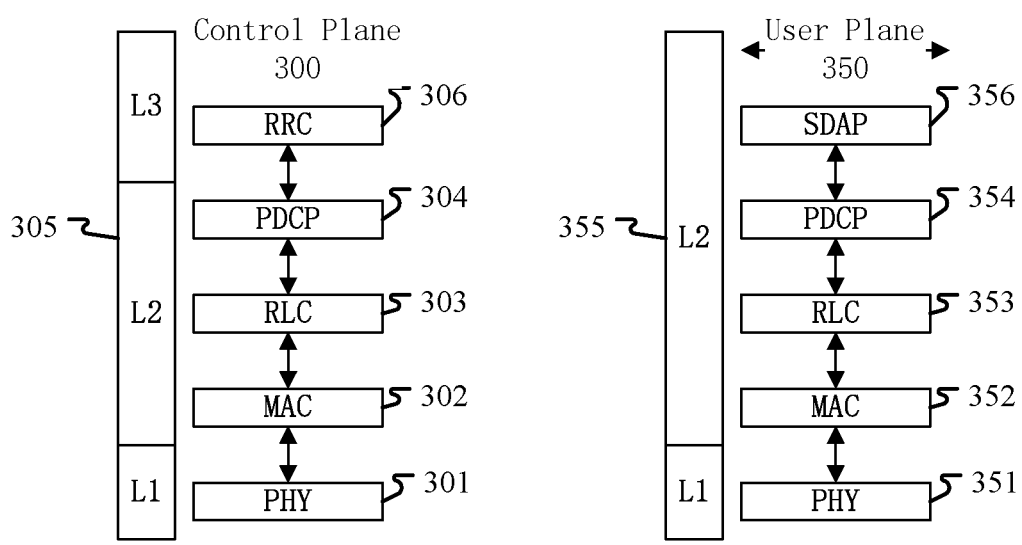
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first communication node equipment (UE, gNB or RSU in V2X) and a second communication node equipment (gNB, UE or RSU in V2X) or between two UEs is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first communication node equipment and the second communication node equipment and between two UEs over the PHY 301. The L2 Layer 305 includes a Medium Access Control (MAC) sublayer 302, a Radio Link Control (RLC) sublayer 303, and a Packet Data Convergence Protocol (PDCP) sublayer 304, which are terminated at the second communication node equipment. The PDCP sublayer 304 provides multiplexing between different radio bearers and logical channels. The PDCP sublayer 304 also provides security by encrypting packets and provides support for handover of the first communication node equipment between second communication node equipments. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first communication node equipment. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second communication node equipment and the first communication node equipment. The radio protocol architecture of the user plane 350 includes a Layer 1 (L1 layer) and a Layer 2 (L2 layer); the radio protocol architecture for the first communication node equipment and the second communication node equipment in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first communication node equipment may include several higher layers above the L2 Layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first information in the disclosure is generated on the RRC sublayer 306.

In one embodiment, the first information in the disclosure is generated on the MAC sublayer 302.

In one embodiment, the second information in the disclosure is generated on the RRC sublayer 306.

In one embodiment, the second information in the disclosure is generated on the MAC sublayer 302.

In one embodiment, the first signaling in the disclosure is generated on the PHY 301.

In one embodiment, the second signaling in the disclosure is generated on the PHY 301.

In one embodiment, the first radio signal in the disclosure is generated on the PHY 301.

In one embodiment, the first bit block in the disclosure is generated on the RRC sublayer 306.

In one embodiment, the first bit block in the disclosure is generated on the MAC sublayer 302.

In one embodiment, the first bit block in the disclosure is generated on the PHY 301.

In one embodiment, the second bit block in the disclosure is generated on the RRC sublayer 306.

In one embodiment, the second bit block in the disclosure is generated on the MAC sublayer 302.

In one embodiment, the second bit block in the disclosure is generated on the PHY 301.

Embodiment 4

Figure 4:
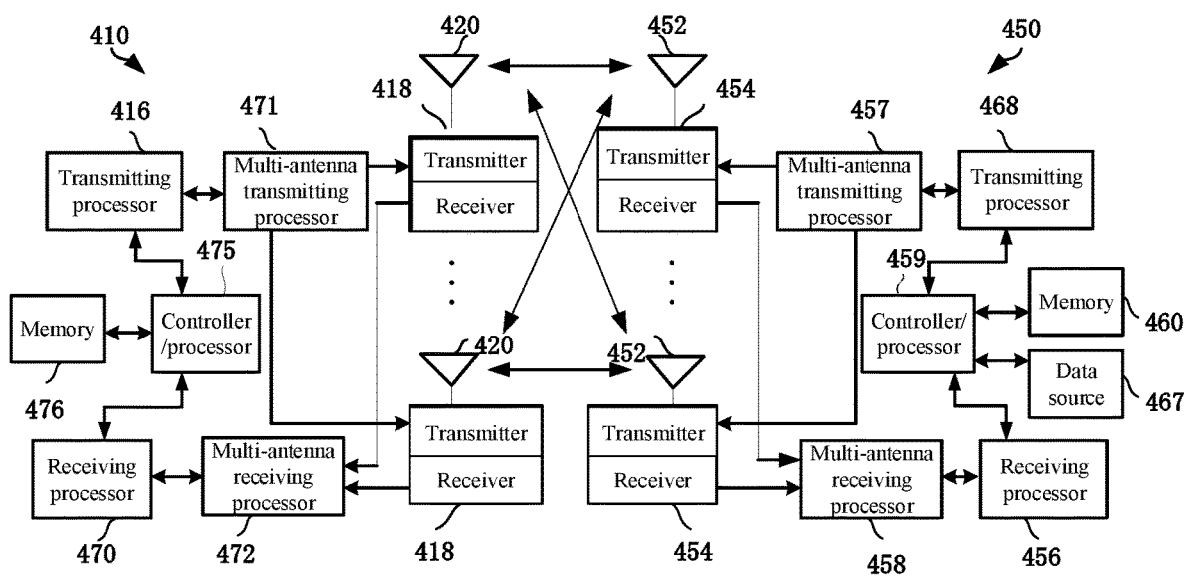
FIG. 4 is a diagram illustrating a first communication equipment and a second communication equipment according to one embodiment of the disclosure.

Embodiment 4 illustrates a diagram of a first communication equipment and a second communication equipment according to the disclosure, as shown in FIG. 4. FIG. 4 is a block diagram of a second communication equipment 450 and a first communication equipment 410 that are in communication with each other in an access network.

The first communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication equipment 410 to the second communication equipment 450, at the first communication equipment 410, a higher-layer packet from a core network is provided to the controller/processor 475. The controller/processor 475 provides functions of Layer 2. In a transmission from the first communication equipment 410 to the second communication equipment 450, the controller/processor 475 provides header compression, encryption, packet segmentation and reordering, multiplexing between a logical channel and a transport channel, and a radio resource allocation for the second communication equipment 450 based on various priority metrics. The controller/processor 475 is also in charge of retransmission of lost packets, and signalings to the second communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the first communication equipment 410 to the second communication equipment 450, at the second communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the first communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In a transmission from the first communication equipment 410 to the second communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the second communication equipment 450 to the first communication equipment 410, at the second communication equipment 450, the data source 467 provides a higher-layer packet to the controller/processor 459. The data source 467 illustrates all protocol layers above the L2 layer. Similar as the transmitting function of the first communication equipment 410 described in the transmission from the first communication equipment 410 to the second communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the first communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multi-carrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the second communication equipment 450 to the first communication equipment 410, the function of the first communication equipment 410 is similar as the receiving function of the second communication equipment 450 described in the transmission from first communication equipment 410 to the second communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In a transmission from the second communication equipment 450 to the first communication equipment 410, the controller/processor 475 provides de-multiplexing between the transport channel and the logical channel, packet reassembling, decryption, header decompression, and control signal processing so as to recover higher-layer packets coming from the second communication equipment 450. The higher-layer packet, coming from the controller/processor 475, may be provided to the core network.

In one embodiment, the first node in the disclosure includes the second communication equipment 450, and the second node in the disclosure includes the first communication equipment 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second communication equipment 450 includes at least one controller/processor; and the at least one controller/processor is in charge of HARQ operations.

In one subembodiment, the first communication equipment 410 includes at least one controller/processor; and the at least one controller/processor is in charge of HARQ operations.

In one subembodiment, the first communication equipment 410 includes at least one controller/processor; and the at least one controller/processor performs an error detection using ACK and/or NACK protocols to support HARQ operations.

In one embodiment, the second communication equipment 450 includes at least one processor and at least one memory. The at least one memory includes computer program codes. The at least one memory and the computer program codes are configured to be used in collaboration with the at least one processor. The second communication equipment 450 at least receives a first signaling, the first signaling being used for indicating a first time-frequency resource group and the first time-frequency resource group being reserved for a first bit block, receives a second signaling, the second signaling being used for determining a second time-frequency resource group and the second time-frequency resource group being reserved for a second bit block, transmits the first bit block in time-frequency resources in the first time-frequency resource group other than a first resource subgroup, and transmits the second bit block in the second time-frequency resource group; wherein the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one subembodiment, the second communication equipment 450 corresponds to the first node in the disclosure.

In one embodiment, the second communication equipment 450 includes a memory that stores a computer readable instruction program. The computer readable instruction program generates an action when executed by at least one processor. The action includes: receiving a first signaling, the first signaling being used for indicating a first time-frequency resource group and the first time-frequency resource group being reserved for a first bit block, receiving a second signaling, the second signaling being used for determining a second time-frequency resource group and the second time-frequency resource group being reserved for a second bit block, transmitting the first bit block in time-frequency resources in the first time-frequency resource group other than a first resource subgroup, and transmitting the second bit block in the second time-frequency resource group; wherein the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one subembodiment, the second communication equipment 450 corresponds to the first node in the disclosure.

In one embodiment, the first communication equipment 410 includes at least one processor and at least one memory. The at least one memory includes computer program codes. The at least one memory and the computer program codes are configured to be used in collaboration with the at least one processor. The first communication equipment 410 at least transmits a first signaling, the first signaling being used for indicating a first time-frequency resource group and the first time-frequency resource group being reserved for a first bit block, transmits a second signaling, the second signaling being used for determining a second time-frequency resource group and the second time-frequency resource group being reserved for a second bit block, receives the first bit block in time-frequency resources in the first time-frequency resource group other than a first resource subgroup, and receives the second bit block in the second time-frequency resource group; wherein the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one subembodiment, the first communication equipment 410 corresponds to the second node in the disclosure.

In one embodiment, the first communication equipment 410 includes a memory that stores a computer readable instruction program. The computer readable instruction program generates an action when executed by at least one processor. The action includes: transmitting a first signaling, the first signaling being used for indicating a first time-frequency resource group and the first time-frequency resource group being reserved for a first bit block, transmitting a second signaling, the second signaling being used for determining a second time-frequency resource group and the second time-frequency resource group being reserved for a second bit block, receiving the first bit block in time-frequency resources in the first time-frequency resource group other than a first resource subgroup, and receiving the second bit block in the second time-frequency resource group; wherein the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one subembodiment, the first communication equipment 410 corresponds to the second node in the disclosure.

In one embodiment, at least one of the antenna 452, the receiver 454, the multiantenna receiving processor 458, the receiving processor 456, the controller/processor 459, the memory 460 or the data source 467 is used for receiving the first information in the disclosure.

In one embodiment, at least one of the antenna 420, the transmitter 418, the multiantenna transmitting processor 471, the transmitting processor 416, the controller/processor 475 or the memory 476 is used for transmitting the first information in the disclosure.

In one embodiment, at least one of the antenna 452, the receiver 454, the multiantenna receiving processor 458, the receiving processor 456, the controller/processor 459, the memory 460 or the data source 467 is used for receiving the first signaling in the disclosure.

In one embodiment, at least one of the antenna 420, the transmitter 418, the multiantenna transmitting processor 471, the transmitting processor 416, the controller/processor 475 or the memory 476 is used for transmitting the first signaling in the disclosure.

In one embodiment, at least one of the antenna 452, the receiver 454, the multiantenna receiving processor 458, the receiving processor 456, the controller/processor 459, the memory 460 or the data source 467 is used for receiving the second signaling in the disclosure.

In one embodiment, at least one of the antenna 420, the transmitter 418, the multiantenna transmitting processor 471, the transmitting processor 416, the controller/processor 475 or the memory 476 is used for transmitting the second signaling in the disclosure.

In one embodiment, at least one of the antenna 452, the receiver 454, the multiantenna receiving processor 458, the receiving processor 456, the controller/processor 459, the memory 460 or the data source 467 is used for receiving the first radio signal in the disclosure.

In one embodiment, at least one of the antenna 420, the transmitter 418, the multiantenna transmitting processor 471, the transmitting processor 416, the controller/processor 475 or the memory 476 is used for transmitting the first radio signal in the disclosure.

In one embodiment, at least one of the antenna 452, the transmitter 454, the multiantenna transmitting processor 458, the transmitting processor 468, the controller/processor 459, the memory 460 or the data source 467 is used for transmitting the second information in the disclosure.

In one embodiment, at least one of the antenna 420, the receiver 418, the multiantenna receiver processor 472, the receiver processor 470, the controller/processor 475 or the memory 476 is used for receiving the second information in the disclosure.

In one embodiment, at least one of the antenna 452, the transmitter 454, the multiantenna transmitting processor 458, the transmitting processor 468, the controller/processor 459, the memory 460 or the data source 467 is used for transmitting the first bit block in the disclosure in time-frequency resources in the first time-frequency resource group in the disclosure other than the first resource subgroup.

In one embodiment, at least one of the antenna 420, the receiver 418, the multiantenna receiver processor 472, the receiver processor 470, the controller/processor 475 or the memory 476 is used for receiving the first bit block in the disclosure in time-frequency resources in the first time-frequency resource group in the disclosure other than the first resource subgroup.

In one embodiment, at least one of the antenna 452, the transmitter 454, the multiantenna transmitting processor 458, the transmitting processor 468, the controller/processor 459, the memory 460 or the data source 467 is used for transmitting the second bit block in the disclosure in the second time-frequency resource group in the disclosure.

In one embodiment, at least one of the antenna 420, the receiver 418, the multiantenna receiver processor 472, the receiver processor 470, the controller/processor 475 or the memory 476 is used for receiving the second bit block in the disclosure in the second time-frequency resource group in the disclosure.

Embodiment 5

Figure 5:
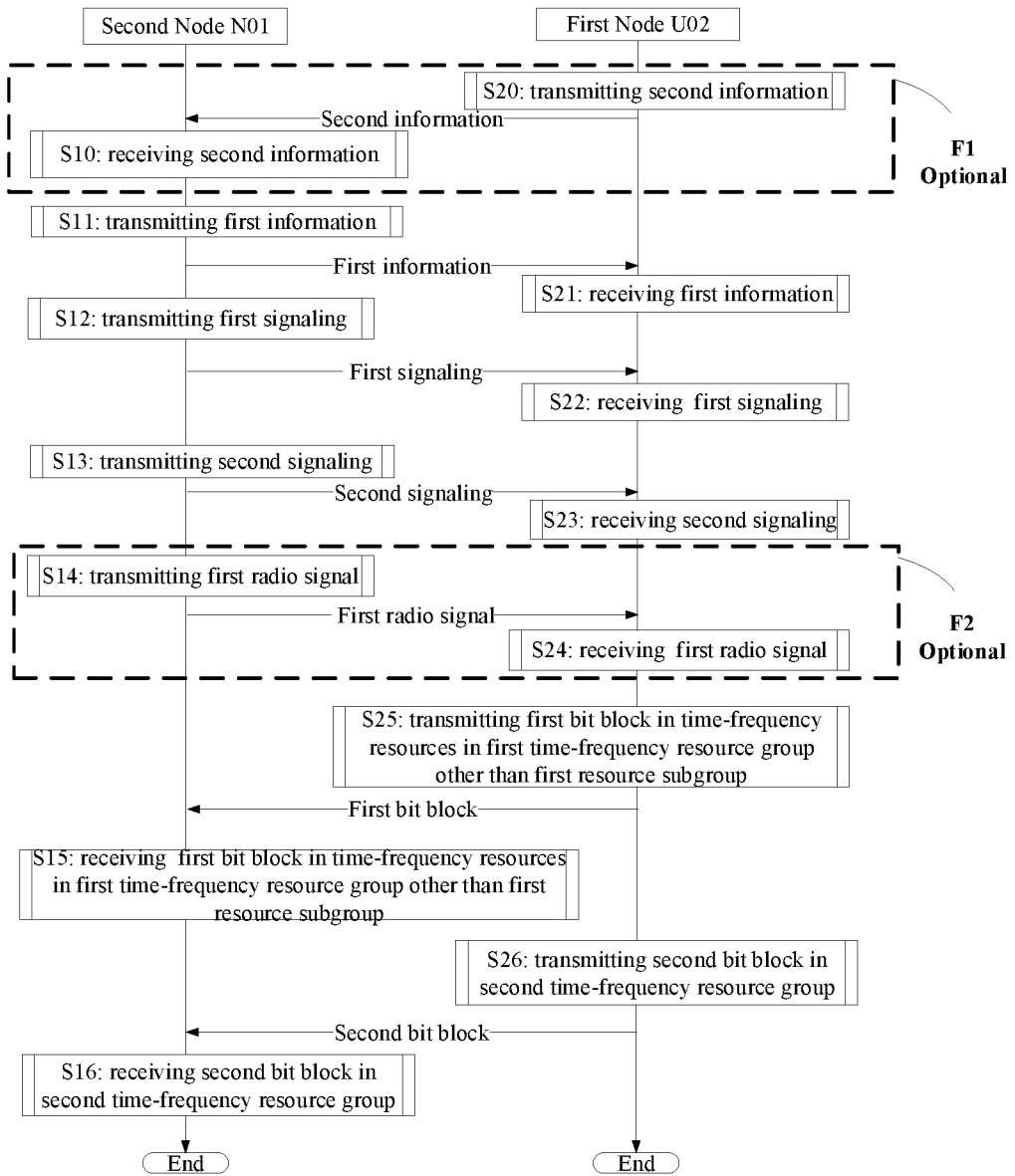
FIG. 5 is a flowchart of transmission of a radio signal according to one embodiment of the disclosure.

Embodiment 5 illustrates a flowchart of transmission of a radio signal according to one embodiment of the disclosure, as shown in FIG. 5. In FIG. 5, a first node U02 and a second node N01 perform communication through an air interface. In FIG. 5, steps in dash-line boxes are optional.

The first node U02 transmits second information in S20, receives first information in S21, receives a first signaling in S22, receives a second signaling in S23, receives a first radio signal in S24, transmits a first bit block in time-frequency resources in a first time-frequency resource group other than a first resource subgroup in S25, and transmits a second bit block in a second time-frequency resource group in S26.

The second node N01 receives second information in S10, transmits first information in S11, transmits a first signaling in S12, transmits a second signaling in S13, transmits a first radio signal in S14, receives a first bit block in time-frequency resources in a first time-frequency resource group other than a first resource subgroup in S15, and receives a second bit block in a second time-frequency resource group in S16.

In Embodiment 5, the first signaling is used for indicating a first time-frequency resource group, and the first time-frequency resource group is reserved for a first bit block; the second signaling is used by the first node U02 to determine a second time-frequency resource group, and the second time-frequency resource group is reserved for a second bit block; the first time-frequency resource group and the second time-frequency resource group are partially overlapping, and the first time-frequency resource group includes the first resource subgroup; the first signaling is used by the first node U02 to determine a first index group, and the second signaling is used by the first node U02 to determine a second index group; the first index group belongs to one of K index sets, the second index group belongs to one of K index sets, and any two of the K index sets are different; whether the first index group and the second index group belong to one same index set among the K index sets is used by the first node U02 to determine the first resource subgroup; the first index group includes a positive integer number of index(es), the second index group includes a positive integer number of index(es), any one of the K index sets includes a positive integer number of index(es), and K is a positive integer greater than 1. The first information is used by the first node U02 to determine the K index sets. The second information is used for indicating the K. The second signaling is used by the first node U02 to determine time-frequency resources occupied by the first radio signal, and the second bit block is related to the first radio signal.

In one embodiment, each index in the first index group belongs to one same index set among K index sets.

In one embodiment, each index in the second index group belongs to one same index set among K index sets.

In one embodiment, any two indexes in the K index sets are different.

In one embodiment, a first given index set and a second given index set are any two index sets among the K index sets, and any one index in the first given index set is different from any one index in the second given index set.

In one embodiment, a first given index set and a second given index set are any two index sets among the K index sets, and there is one index belonging to one of the first given index set and the second given index set only.

In one embodiment, the K is equal to 2.

In one embodiment, the K is greater than 2.

In one embodiment, any one index in the K index sets is a non-negative integer.

In one embodiment, any one index in the K index sets is a positive integer.

In one embodiment, any one index in the first index group is an index of a first-type reference signal, any one index in the second index group is an index of a first-type reference signal, and any one index in the K index sets is an index of a first-type reference signal.

In one subembodiment, the first-type reference signal includes an uplink reference signal.

In one subembodiment, the first-type reference signal includes a downlink reference signal.

In one subembodiment, the first-type reference signal includes at least one of an uplink reference signal and a downlink reference signal.

In one subembodiment, the first-type reference signal includes a (Sounding Reference Signal (SRS).

In one subembodiment, the first-type reference signal includes a Channel State Information-Reference Signal (CSI-RS).

In one subembodiment, the first-type reference signal includes a synchronization signal.

In one subembodiment, the first-type reference signal includes a Synchronization Signal Block (SSB).

In one subembodiment, the first-type reference signal includes a Synchronization Signal/Physical Broadcast Channel (SS/PBCH) block.

In one subembodiment, the first-type reference signal includes at least one of an SRS, a CSI-RS or an SSB.

In one subembodiment, the first-type reference signal includes at least one of an SRS, a CSI-RS, a synchronization signal, an SSB or an SS/PBCH block.

In one embodiment, the first index group includes one index only, the second index group includes one index only, and any one of the K index sets includes one index only In one subembodiment, the K index sets are 0, 1, . . . , K−1 respectively, the first index group is one non-negative integer among 0, 1, . . . , K−1, and the second index group is one non-negative integer among 0, 1, . . . , K−1.

In one subembodiment, the K index sets are 1, 2, . . . , K respectively, the first index group is one positive integer among 1, 2, . . . , K, and the second index group is one positive integer among 1, 2, . . . , K.

In one subembodiment, the K index sets are K reference signal set indexes respectively, the first index group is one of the K reference signal set indexes, the second index group is one of the K reference signal set indexes, and any one of the K reference signal sets includes at least one of a downlink reference signal or an uplink reference signal.

In one subembodiment, the K index sets are K SRS resource set indexes respectively, the first index group is one of the K SRS resource set indexes, and the second index group is one of the K SRS resource set indexes.

In one subembodiment, the K index sets are K antenna panel indexes respectively, the first index group is one of the K antenna panel indexes, and the second index group is one of the K antenna panel indexes.

In one subembodiment, the K index sets are K antenna group indexes respectively, the first index group is one of the K antenna group indexes, and the second index group is one of the K antenna group indexes.

In one subembodiment, whether the first index group and the second index group are the same is used by the first node U02 to determine the first resource subgroup.

In one subembodiment, when the first index group and the second index group belong to one same index set among the K index sets, the first index group and the second index group are the same.

In one subembodiment, when the first index group and the second index group do not belong to one same index set among the K index sets, the first index group and the second index group are different.

In one embodiment, the K index sets are one-to-one corresponding to K antenna panels respectively.

In one subembodiment, a first index set is one of the K index sets to which the first index group belongs, and the first bit block is transmitted by one of the K antenna panels to which the first index set corresponds.

In one subembodiment, a second index set is one of the K index sets to which the second index group belongs, and the second bit block is transmitted by one of the K antenna panels to which the second index set corresponds.

In one embodiment, the K index sets indicate K antenna panels respectively.

In one subembodiment, a first index set is one of the K index sets to which the first index group belongs, and the first bit block is transmitted by one of the K antenna panels to which the first index set corresponds.

In one subembodiment, a second index set is one of the K index sets to which the second index group belongs, and the second bit block is transmitted by one of the K antenna panels to which the second index set corresponds.

In one embodiment, the K index sets are one-to-one corresponding to K antenna groups respectively.

In one subembodiment, a first index set is one of the K index sets to which the first index group belongs, and the first bit block is transmitted by one of the K antenna groups to which the first index set corresponds.

In one subembodiment, a second index set is one of the K index sets to which the second index group belongs, and the second bit block is transmitted by one of the K antenna groups to which the second index set corresponds.

In one embodiment, the K index sets indicate K antenna groups respectively.

In one subembodiment, a first index set is one of the K index sets to which the first index group belongs, and the first bit block is transmitted by one of the K antenna groups to which the first index set corresponds.

In one subembodiment, a second index set is one of the K index sets to which the second index group belongs, and the second bit block is transmitted by one of the K antenna groups to which the second index set corresponds.

In one embodiment, the phrase that whether the first index group and the second index group belong to one same index set among the K index sets includes: whether the first index group and the second index group are the same.

In one embodiment, the phrase that the first index group and the second index group belong to two of the K index sets respectively includes: the first index group and the second index group are different.

In one embodiment, the phrase that the first index group and the second index group belong to one same index set among the K index sets includes: the first index group and the second index group are the same.

In one embodiment, the phrase that whether the first index group and the second index group belong to one same index set among the K index sets includes: whether the first bit block and the second bit block are transmitted by one same antenna panel.

In one embodiment, the phrase that whether the first index group and the second index group belong to one same index set among the K index sets includes: whether the first bit block and the second bit block are transmitted by one same antenna group.

In one embodiment, the phrase that the first index group and the second index group belong to two of the K index sets respectively includes: the first bit block and the second bit block are transmitted by two different antenna panels respectively.

In one embodiment, the phrase that the first index group and the second index group belong to one same index set among the K index sets includes: the first bit block and the second bit block are transmitted by one same antenna panel.

In one embodiment, the phrase that the first index group and the second index group belong to two of the K index sets respectively includes: the first bit block and the second bit block are transmitted by two different antenna groups respectively, and the antenna group includes a positive integer number of antenna(s).

In one embodiment, the phrase that the first index group and the second index group belong to one same index set among the K index sets includes: the first bit block and the second bit block are transmitted by one same antenna group, and the antenna group includes a positive integer number of antenna(s).

In one embodiment, the phrase that whether the first index group and the second index group belong to one same index set among the K index sets includes: whether the first bit block and the second bit block can be transmitted simultaneously.

In one embodiment, the phrase that the first index group and the second index group belong to two of the K index sets respectively includes: the first bit block and the second bit block can be transmitted simultaneously.

In one embodiment, the phrase that the first index group and the second index group belong to one same index set among the K index sets includes: the first bit block and the second bit block cannot be transmitted simultaneously.

In one embodiment, the phrase that whether the first index group and the second index group belong to one same index set among the K index sets includes: whether the transmission of the first bit block and the transmission of the second bit block employ a same Timing Advance (TA).

In one embodiment, the phrase that the first index group and the second index group belong to two of the K index sets respectively includes: the transmission of the first bit block and the transmission of the second bit block employ different TAs.

In one embodiment, the phrase that the first index group and the second index group belong to one same index set among the K index sets includes: the transmission of the first bit block and the transmission of the second bit block employ a same TA.

In one embodiment, the phrase that whether the first index group and the second index group belong to one same index set among the K index sets includes: whether the transmission of the first bit block and the transmission of the second bit block employ a same QCL parameter.

In one embodiment, the phrase that the first index group and the second index group belong to two of the K index sets respectively includes: the transmission of the first bit block and the transmission of the second bit block employ different QCL parameters.

In one embodiment, the phrase that the first index group and the second index group belong to one same index set among the K index sets includes: the transmission of the first bit block and the transmission of the second bit block employ a same QCL parameter.

In one embodiment, the antenna panel includes a positive integer number of antenna(s).

In one embodiment, the antenna group includes a positive integer number of antenna(s).

In one embodiment, any two of the K antenna panels are different.

In one embodiment, any two of the K antenna groups are different.

In one embodiment, the first signaling is used for indicating the first index group.

In one embodiment, the first signaling indicates explicitly the first index group.

In one embodiment, the first signaling indicates implicitly the first index group.

In one embodiment, the first signaling indicates directly the first index group.

In one embodiment, the first signaling indicates indirectly the first index group.

In one embodiment, the first signaling indicates a first reference signal group and a first index group, and the first reference signal group includes a positive integer number of reference signal(s).

In one subembodiment, the first index group includes one index only, the second index group includes one index only, and any one of the K index sets includes one index only In one subembodiment, the first signaling is a DCI signaling, and the first reference signal group is indicated by an SRS resource indicator field.

In one subembodiment, the first signaling is a DCI signaling, and the first reference signal group is indicated by a transmission configuration indication field.

In one subembodiment, a transmitting antenna port of the first bit block is Quasi Co-Located (QCLed) with one antenna port in a transmitting antenna port group of the first reference signal group.

In one subembodiment, a transmitting antenna port of the first bit block is Quasi Co-Located (QCLed) with at least one antenna port in a transmitting antenna port group of the first reference signal group.

In one subembodiment, a transmitting antenna port of the first bit block is Quasi Co-Located (QCLed) with any one antenna port in a transmitting antenna port group of the first reference signal group.

In one subembodiment, a transmitting antenna port of the first bit block is spatially QCLed with one antenna port in a transmitting antenna port group of the first reference signal group.

In one subembodiment, a transmitting antenna port of the first bit block is spatially QCLed with at least one antenna port in a transmitting antenna port group of the first reference signal group.

In one subembodiment, a transmitting antenna port of the first bit block is spatially QCLed with any one antenna port in a transmitting antenna port group of the first reference signal group.

In one embodiment, the first signaling indicates a first reference signal group, the first reference signal group is used by the first node U02 to determine the first index group, and the first reference signal group includes a positive integer number of reference signal(s).

In one subembodiment, the first index group includes one index only, the second index group includes one index only, and any one of the K index sets includes one index only.

In one subembodiment, the K index sets are K reference signal set indexes respectively, the first reference signal group belongs to one of the K reference signal sets, and the first index group is one of the K reference signal set indexes to which the first reference signal group belongs.

In one subembodiment, the first index group is an index of the first reference signal group.

In one subembodiment, configuration information of the first reference signal group includes the first index group, the configuration information of the first reference signal group is indicated by an RRC signaling, and the configuration information of the first reference signal group includes at least one of occupied time domain resources, occupied frequency domain resources, a number of antenna ports, multiantenna related transmitting or multiantenna related receiving.

In one subembodiment, an RRC signaling indicates that the first reference signal group and the first index group are in correspondence.

In one subembodiment, the first index group is indicated by a PUSCH-Config IE (Information Element) of an RRC signaling.

In one subembodiment, the first index group is indicated by a TCI-State IE of an RRC signaling.

In one subembodiment, the first index group is indicated by an NZP-CSI-RS-ResourceSet IE of an RRC signaling.

In one subembodiment, the first index group is indicated by an NZP-CSI-RS-Resource IE of an RRC signaling.

In one subembodiment, the first index group is indicated by an SRS-Config IE of an RRC signaling.

In one embodiment, the phrase that two antenna ports are QCLed refers that: partial or all large-scale properties of a radio signal transmitted by one of the two antenna ports can be deduced from partial or all large-scale properties of a radio signal transmitted by the other one of the two antenna ports.

In one embodiment, the phrase that two antenna ports are QCLed refers that: the two antenna ports have at least one same QCL parameter.

In one embodiment, the phrase that two antenna ports are QCLed refers that: at least one QCL parameter of one of the two antenna ports can be deduced from at least one QCL parameter of the other one of the two antenna ports.

In one embodiment, the phrase that two antenna ports are QCLed refers that: multiantenna related receiving of a radio signal transmitted by one of the two antenna ports can be deduced from multiantenna related receiving of a radio signal transmitted by the other one of the two antenna ports.

In one embodiment, the phrase that two antenna ports are QCLed refers that: multiantenna related transmitting of a radio signal transmitted by one of the two antenna ports can be deduced from multiantenna related transmitting of a radio signal transmitted by the other one of the two antenna ports.

In one embodiment, the phrase that two antenna ports are QCLed refers that: multiantenna related transmitting of a radio signal transmitted by one of the two antenna ports can be deduced from multiantenna related receiving of a radio signal transmitted by the other one of the two antenna ports, a receiver of the radio signal transmitted by one of the two antenna ports is the same as a transmitter of the radio signal transmitted by the other one of the two antenna ports.

In one embodiment, the QCL parameter includes at least one of multiantenna related QCL parameters or multiantenna unrelated QCL parameters.

In one embodiment, the QCL parameter includes multiantenna related QCL parameters.

In one embodiment, the QCL parameter includes multiantenna unrelated QCL parameters.

In one embodiment, the QCL parameter includes multiantenna related QCL parameters and multiantenna unrelated QCL parameters.

In one embodiment, the multiantenna related QCL parameters include spatial RX parameters.

In one embodiment, the multiantenna related QCL parameters include one or more of angle of arrival, angle of departure, spatial correlation, multiantenna related transmitting or multiantenna related receiving.

In one embodiment, the multiantenna unrelated QCL parameters include one or more of delay spread, Doppler spread, Doppler shift, path loss or average gain.

In one embodiment, the phrase that two antenna ports are spatially QCLed refers that: partial or all multiantenna related large-scale properties of a radio signal transmitted by one of the two antenna ports can be deduced from partial or all multiantenna related large-scale properties of a radio signal transmitted by the other one of the two antenna ports.

In one embodiment, the phrase that two antenna ports are spatially QCLed refers that: the two antenna ports have at least one same multiantenna related QCL parameter.

In one embodiment, the phrase that two antenna ports are spatially QCLed refers that: at least one multiantenna related QCL parameter of one of the two antenna ports can be deduced from at least one multiantenna related QCL parameter of the other one of the two antenna ports.

In one embodiment, the phrase that two antenna ports are spatially QCLed refers that: multiantenna related receiving of a radio signal transmitted by one of the two antenna ports can be deduced from multiantenna related receiving of a radio signal transmitted by the other one of the two antenna ports.

In one embodiment, the phrase that two antenna ports are spatially QCLed refers that: multiantenna related transmitting of a radio signal transmitted by one of the two antenna ports can be deduced from multiantenna related transmitting of a radio signal transmitted by the other one of the two antenna ports.

In one embodiment, the phrase that two antenna ports are spatially QCLed refers that: multiantenna related transmitting of a radio signal transmitted by one of the two antenna ports can be deduced from multiantenna related receiving of a radio signal transmitted by the other one of the two antenna ports, a receiver of the radio signal transmitted by one of the two antenna ports is the same as a transmitter of the radio signal transmitted by the other one of the two antenna ports.

In one embodiment, the second signaling is used for indicating a second index group.

In one embodiment, the second signaling indicates explicitly a second index group.

In one embodiment, the second signaling indicates implicitly a second index group.

In one embodiment, the second signaling indicates directly a second index group.

In one embodiment, the second signaling indicates indirectly a second index group.

In one embodiment, the second signaling is used by the first node U02 to determine a second time-frequency resource group, and the second time-frequency resource group is used by the first node U02 to determine the second index group.

In one subembodiment, an RRC signaling indicates that the second time-frequency resource group and the second index group are in correspondence.

In one subembodiment, the second index group is indicated by a PUCCH-Config IE of an RRC signaling.

In one subembodiment, the second index group is indicated by a PUCCH-Config field of an RRC signaling.

In one subembodiment, the second index group is indicated by a PUCCH-SpatialRelationInfo field of an RRC signaling.

In one subembodiment, the second index group is indicated by a PUCCH-ResourceSet field of an RRC signaling.

In one subembodiment, configuration information of the second time-frequency resource group includes the second index group, the configuration information of the second time-frequency resource group is indicated by an RRC signaling, and the configuration information of the second time-frequency resource group includes at least one of occupied time domain resources, occupied frequency domain resources, multiantenna related transmitting or multiantenna related receiving.

In one subembodiment, the second time-frequency resource group and the second index group are indicated by one same IE in an RRC signaling.

In one subembodiment, the second time-frequency resource group and the second index group are indicated by two different IEs in an RRC signaling respectively.

In one embodiment, the second signaling indicates a second reference signal group and a second index group, and the second reference signal group includes a positive integer number of reference signals.

In one subembodiment, the first index group includes one index only, the second index group includes one index only, and any one of the K index sets includes one index only.

In one subembodiment, the second signaling is a DCI signaling, and the second reference signal group is indicated by an SRS resource indicator field.

In one subembodiment, the second signaling is a DCI signaling, and the second reference signal group is indicated by a transmission configuration indication field.

In one subembodiment, a transmitting antenna port of the second bit block is Quasi Co-Located (QCLed) with one antenna port in a transmitting antenna port group of the second reference signal group.

In one subembodiment, a transmitting antenna port of the second bit block is Quasi Co-Located (QCLed) with at least one antenna port in a transmitting antenna port group of the second reference signal group.

In one subembodiment, a transmitting antenna port of the second bit block is Quasi Co-Located (QCLed) with any one antenna port in a transmitting antenna port group of the second reference signal group.

In one subembodiment, a transmitting antenna port of the second bit block is spatially QCLed with one antenna port in a transmitting antenna port group of the second reference signal group.

In one subembodiment, a transmitting antenna port of the second bit block is spatially QCLed with at least one antenna port in a transmitting antenna port group of the second reference signal group.

In one subembodiment, a transmitting antenna port of the second bit block is spatially QCLed with any one antenna port in a transmitting antenna port group of the second reference signal group.

In one embodiment, the second signaling indicates a second reference signal group, the second reference signal group is used by the first node U02 to determine the second index group, and the second reference signal group includes a positive integer number of reference signal(s).

In one subembodiment, the first index group includes one index only, the second index group includes one index only, and any one of the K index sets includes one index only.

In one subembodiment, the K index sets are K reference signal set indexes respectively, the second reference signal group belongs to one of the K reference signal sets, and the second index group is one of the K reference signal set indexes to which the second reference signal group belongs.

In one subembodiment, the second index group is an index of the second reference signal group.

In one subembodiment, configuration information of the second reference signal group includes the second index group, the configuration information of the second reference signal group is indicated by an RRC signaling, and the configuration information of the second reference signal group includes at least one of occupied time domain resources, occupied frequency domain resources, a number of antenna ports, multiantenna related transmitting or multiantenna related receiving.

In one subembodiment, an RRC signaling indicates that the second reference signal group and the second index group are in correspondence.

In one subembodiment, the second index group is indicated by a PUSCH-Config IE (Information Element) of an RRC signaling.

In one subembodiment, the second index group is indicated by a TCI-State IE of an RRC signaling.

In one subembodiment, the second index group is indicated by an NZP-CSI-RS-ResourceSet IE of an RRC signaling.

In one subembodiment, the second index group is indicated by an NZP-CSI-RS-Resource IE of an RRC signaling.

In one subembodiment, the second index group is indicated by an SRS-Config IE of an RRC signaling.

In one embodiment, the first information is configured semi-statically.

In one embodiment, the first information is carried by a higher layer signaling.

In one embodiment, the first information is carried by an RRC signaling.

In one embodiment, the first information is carried by an MAC CE signaling.

In one embodiment, the first information incudes part or an entirety of one IE in one RRC signaling.

In one embodiment, the first information incudes multiple IEs in one RRC signaling.

In one embodiment, the first information is used for indicating the K index sets.

In one embodiment, the first information indicates explicitly the K index sets.

In one embodiment, the first information indicates implicitly the K index sets.

In one embodiment, the first information indicates directly the K index sets.

In one embodiment, the first information indicates indirectly the K index sets.

In one embodiment, the first information indicates the K.

In one embodiment, the first information indicates the K, and the K is used by the first node U02 to determine the K index sets.

In one subembodiment, the K index sets are 0, 1, 2, . . . , K−1 respectively.

In one subembodiment, the K index sets are 1, 2, . . . , K respectively.

In one embodiment, the second information belongs to UE capability reporting.

In one embodiment, the second information is configured semi-statically.

In one embodiment, the second information is carried by a higher layer signaling.

In one embodiment, the second information is carried by an RRC signaling.

In one embodiment, the second information is carried by an MAC CE signaling.

In one embodiment, the second information incudes part or an entirety of one IE in one RRC signaling.

In one embodiment, the second information incudes multiple IEs in one RRC signaling.

In one embodiment, the second information indicates explicitly the K.

In one embodiment, the second information indicates implicitly the K.

In one embodiment, the second information indicates directly the K.

In one embodiment, the second information indicates indirectly the K.

In one embodiment, the second signaling is used for indicating time-frequency resources occupied by the first radio signal.

In one embodiment, the second signaling indicates explicitly time-frequency resources occupied by the first radio signal.

In one embodiment, the second signaling indicates implicitly time-frequency resources occupied by the first radio signal.

In one embodiment, the second signaling indicates directly time-frequency resources occupied by the first radio signal.

In one embodiment, the second signaling indicates indirectly time-frequency resources occupied by the first radio signal.

In one embodiment, the first radio signal includes data.

In one embodiment, the first radio signal includes data and a DMRS.

In one embodiment, the first radio signal includes a reference signal.

In one embodiment, the first radio signal includes a CSI-RS.

In one embodiment, the first radio signal includes a CSI-RS and a Channel State Information Interference Measurement Resource (CSI-IMR).

In one embodiment, the second signaling is used for indicating scheduling information of the first radio signal.

In one embodiment, the scheduling information of the first radio signal includes at least one of occupied time domain resources, occupied frequency domain resources, an MCS, DMRS configuration information, a HARQ process number, an RV, an NDI, an transmitting antenna port, corresponding multiantenna related transmitting or corresponding multiantenna related receiving.

In one subembodiment, the first radio signal includes data.

In one subembodiment, the first radio signal includes data and a DMRS.

In one subembodiment, the DMRS configuration information included in the scheduling information of the first radio signal includes at least one of an RS sequence, a mapping mode, a DMRS type, occupied time domain resources, occupied frequency domain resources, occupied code domain resources, a cyclic shift and an OCC.

In one embodiment, the second signaling is used by the first node U02 to determine the configuration information of the first radio signal.

In one embodiment, the second signaling indicates an index of the first radio signal.

In one embodiment, the second signaling includes a first field, and the first field included in the second signaling is used by the first node U02 to determine the configuration information of the first radio signal.

In one subembodiment, the first field included in the second signaling is used for indicating a first report configuration from multiple report configurations, and the first report configuration includes the configuration information of the first radio signal.

In one subembodiment, the first field included in the second signaling is used for indicating an index of a first report configuration in multiple report configurations, and the first report configuration includes the configuration information of the first radio signal.

In one subembodiment, the first field included in the second signaling is a CSI request field, and the specific definition of the CSI request field can refer to Chapter 7.3.1.1 in 3GPP TS38.212.

In one embodiment, the configuration information of the first radio signal includes at least one of occupied time domain resources, occupied frequency domain resources, occupied code domain resources, a cyclic shift, an OCC, an occupied antenna port, a transmitting type, corresponding multiantenna related transmitting or corresponding multiantenna related receiving.

In one subembodiment, the first radio signal includes a reference signal.

In one subembodiment, the first radio signal includes a CSI-RS.

In one subembodiment, the first radio signal includes a CSI-RS and a CSI-IMR.

In one embodiment, the multiantenna related receiving is a Transmission Configuration Indicator (TCI).

In one embodiment, the multiantenna related receiving is QCL information.

In one embodiment, the multiantenna related receiving is spatial Rx parameters.

In one embodiment, the multiantenna related receiving is a receiving beam.

In one embodiment, the multiantenna related receiving is a receiving beamforming matrix.

In one embodiment, the multiantenna related receiving is a receiving analog beamforming matrix.

In one embodiment, the multiantenna related receiving is a receiving analog beamforming vector.

In one embodiment, the multiantenna related receiving is a receiving beamforming matrix.

In one embodiment, the multiantenna related receiving is receiving spatial filtering.

In one embodiment, the multiantenna related transmitting is a TCI.

In one embodiment, the multiantenna related transmitting is QCL information.

In one embodiment, the multiantenna related transmitting is spatial Tx parameters.

In one embodiment, the multiantenna related transmitting is a transmitting beam.

In one embodiment, the multiantenna related transmitting is a transmitting beamforming matrix.

In one embodiment, the multiantenna related transmitting is a transmitting analog beamforming matrix.

In one embodiment, the multiantenna related transmitting is a transmitting analog beamforming vector.

In one embodiment, the multiantenna related transmitting is a transmitting beamforming matrix.

In one embodiment, the multiantenna related transmitting is transmitting spatial filtering.

In one embodiment, the spatial Tx parameter includes one or more of a transmitting antenna port, a transmitting antenna port group, a transmitting beam, a transmitting analog beamforming matrix, a transmitting analog beamforming vector, a transmitting beamforming matrix, a transmitting beamforming vector and transmitting spatial filtering.

In one embodiment, the spatial Rx parameter includes one or more of a receiving beam, a receiving analog beamforming matrix, a receiving analog beamforming vector, a receiving beamforming matrix, a receiving beamforming vector and receiving spatial filtering.

In one embodiment, the second bit block is used by the second node N01 to determine whether the first radio signal is correctly received.

In one embodiment, the second bit block indicates whether the first radio signal is correctly received.

In one embodiment, the second bit block carries a HARQ-ACK feedback for the first radio signal.

In one embodiment, a measurement for the first radio signal is used for generating the second bit block.

In one embodiment, the first radio signal includes a CSI-RS, and the second bit block includes a CSI.

In one subembodiment, the CSI includes at least one of a CSI-RS (Resource Indicator (CRI), a Rank indication (RI), a Precoding matrix indicator (PMI), a Channel quality indicator (CQI), a Reference Signal Received Power (RSRP), a Reference Signal Received Quality (RSRQ) or a Received Signal Strength Indication (RSSI).

Embodiment 6

Figure 6:
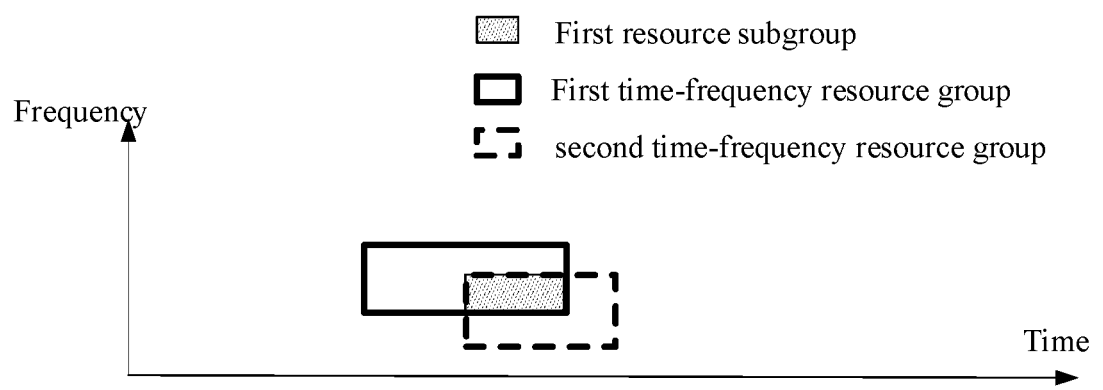
FIG. 6 is a diagram of determining a first resource subgroup according to one embodiment of the disclosure.

Embodiment 6 illustrates a diagram of determining a first resource subgroup according to one embodiment of the disclosure, as shown in FIG. 6.

In Embodiment 6, when the first index group and the second index group in the disclosure belong to two index sets among the K index sets in the disclosure respectively, the first resource subgroup includes all time-frequency resources in the first time-frequency resource group in the disclosure that are overlapping with time-frequency resources occupied by the second time-frequency resource group.

In one embodiment, time-frequency resources in the first time-frequency resource group other than the first resource subgroup are orthogonal to time-frequency resources occupied by the second time-frequency resource group.

Embodiment 7

Figure 7:
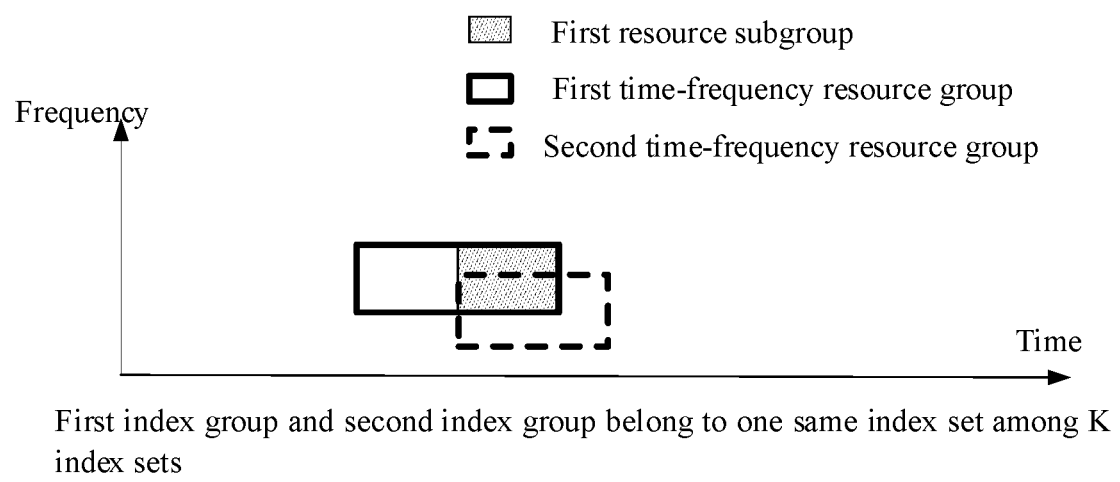
FIG. 7 is a diagram of determining a first resource subgroup according to another embodiment of the disclosure.

Embodiment 7 illustrates a diagram of determining a first resource subgroup according to another embodiment of the disclosure, as shown in FIG. 7.

In Embodiment 7, when the first index group and the second index group in the disclosure belong to one same index set among the K index sets in the disclosure, the first resource subgroup includes all time-frequency resources in the first time-frequency resource group in the disclosure that are overlapping in time domain with the second time-frequency resource group.

In one embodiment, time domain resources occupied by the first resource subgroup belong to time domain resources occupied by the second time-frequency resource group.

In one embodiment, time domain resources in the time domain resources occupied by the first time-frequency resource group other than the time domain resources occupied by the first resource subgroup are orthogonal to time domain resources occupied by the second time-frequency resource group.

Embodiment 8

Figure 8:
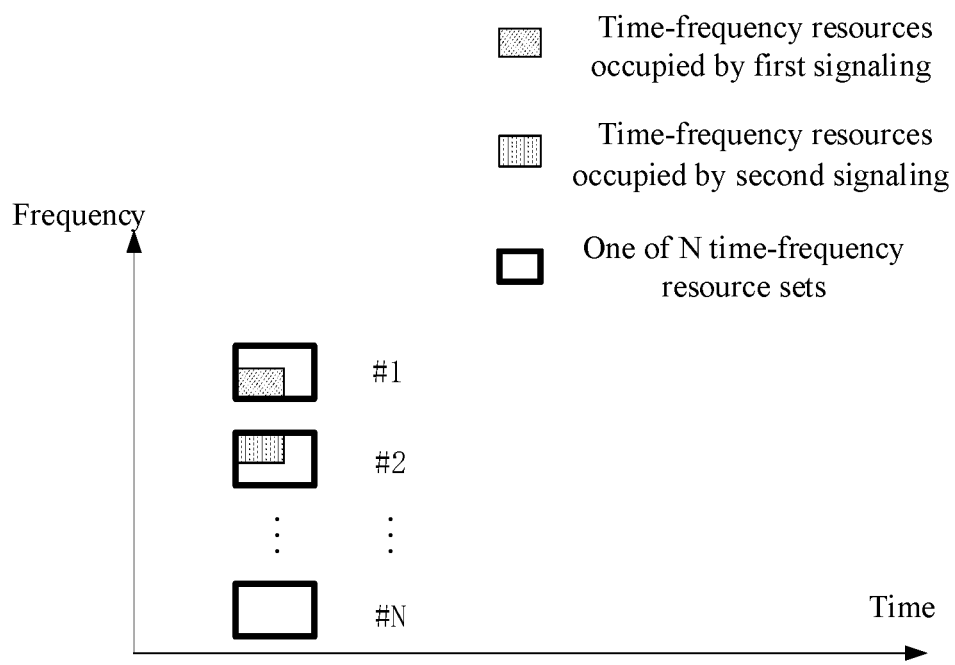
FIG. 8 is a diagram illustrating a relationship between a first signaling and a second signaling according to one embodiment of the disclosure.

Embodiment 8 illustrates a diagram of a relationship between a first signaling and a second signaling according to one embodiment of the disclosure, as shown in FIG. 8.

In Embodiment 8, time-frequency resources occupied by the first signaling and time-frequency resources occupied by the second signaling belong to two of N time-frequency resource sets respectively, any two of the N time-frequency resource sets are orthogonal, and N is a positive integer greater than 1.

In one embodiment, the N is equal to 2.

In one embodiment, the N is greater than 2.

In one embodiment, the N time-frequency resource sets include N COntrol-REsource SETs (CORESETs) respectively.

In one embodiment, the N time-frequency resource sets include N search spaces respectively.

In one embodiment, the N time-frequency resource sets include N PDCCH candidates respectively.

In one embodiment, any two of the N time-frequency resource sets are not overlapping.

In one embodiment, any two of the N time-frequency resource sets include no same RE.

In one embodiment, any one RE in any one of the N time-frequency resource sets does not belong to other time-frequency resource sets among the N time-frequency resource sets.

Embodiment 9

Figure 9:
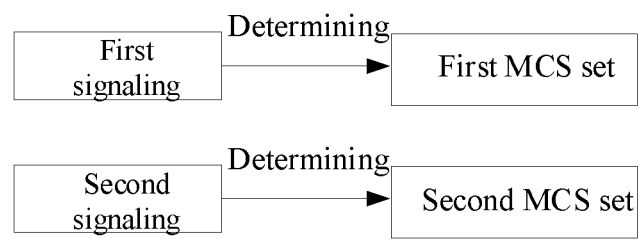
FIG. 9 is a diagram illustrating a relationship between a first signaling and a second signaling according to another embodiment of the disclosure.

Embodiment 9 illustrates a diagram of a relationship between a first signaling and a second signaling according to another embodiment of the disclosure, as shown in FIG. 9.

In Embodiment 9, the first signaling is used for determining a first MCS set, the second signaling is used for determining a second MCS set, and a target BLER of the first MCS set is greater than a target BLER of the second MCS set.

In one embodiment, the first MCS set includes multiple MCSs.

In one embodiment, the second MCS set includes multiple MCSs.

In one embodiment, a target BLER of the first MCS set is equal to 0.1.

In one embodiment, a target BLER of the first MCS set is less than 0.1.

In one embodiment, a target BLER of the second MCS set is less than 0.1.

In one embodiment, a target BLER of the second MCS set is equal to 0.001.

In one embodiment, a target BLER of the second MCS set is equal to 0.00001.

In one embodiment, the first signaling carries a first identifier, the first identifier is used for determining a first MCS set, and the first signaling is used for indicating from the first MCS set an MCS of a radio signal transmitting the first bit block; the second signaling carries a second identifier, the second identifier is used for determining a second MCS set, and the second signaling is used for indicating from the second MCS set an MCS of a radio signal transmitting the second bit block.

In one subembodiment, the first identifier and the second identifier are two different non-negative integers respectively.

In one subembodiment, the first identifier and the second identifier are two different signaling identifiers respectively.

In one subembodiment, the first identifier and the second identifier are two different Radio Network Temporary Identifiers (RNTIs) respectively.

In one subembodiment, the second identifier includes a Cell-RNTI (C-RNTI) or Configured Scheduling-RNTI (CS-RNTI), the first identifier includes an MCS-C-RNTI, and the specific definition of the MCS-C-RNTI can refer to Chapter 5.1.3.1 in 3GPP TS38.214.

In one subembodiment, the first identifier includes one of multiple RNTIs, the second identifier includes one of the multiple RNTIs different from the first identifier; the multiple RNTIs include at least two of a C-RNTI, a CS-RNTI and an MCS-C-RNTI.

In one subembodiment, the first identifier includes one of multiple RNTIs, the second identifier includes one of the multiple RNTIs different from the first identifier; the multiple RNTIs include at least one of a C-RNTI or a CS-RNTI and includes an MCS-C-RNTI.

In one subembodiment, the first identifier is a signaling identifier of the first signaling.

In one subembodiment, the first signaling is a DCI signaling identified with the first identifier.

In one subembodiment, the first identifier is used for generating a Reference Signal (RS) sequence of a DMRS of the first signaling.

In one subembodiment, a Cyclic Redundancy Check (CRC) bit sequence of the first signaling is scrambled with the first identifier.

In one subembodiment, the second identifier is a signaling identifier of the second signaling.

In one subembodiment, the second signaling is a DCI signaling identified with the second identifier.

In one subembodiment, the second identifier is used for generating an RS sequence of a DMRS of the second signaling.

In one subembodiment, a CRC bit sequence of the second signaling is scrambled with the second identifier.

Embodiment 10

Figure 10:
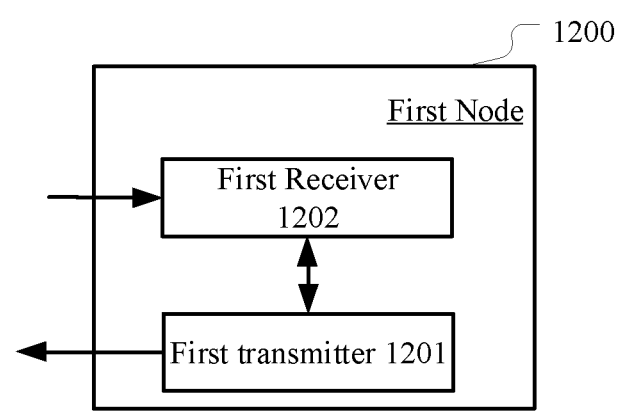
FIG. 10 is a structure block diagram illustrating a processing device in a first node according to one embodiment of the disclosure.

Embodiment 10 illustrates a structure block diagram of a processing device in a first node, as shown in FIG. 10. In FIG. 10, the processing device 1200 in the first node includes a first transmitter 1201 and a first receiver 1202.

In one embodiment, the first node 1200 is a UE.

In one embodiment, the first node 1200 is a relay node

In one embodiment, the first node 1200 is a base station.

In one embodiment, the first node 1200 is a vehicle-mounted communication equipment.

In one embodiment, the first node 1200 is a UE supporting V2X communication.

In one embodiment, the first node 1200 is a relay node supporting V2X communication.

In one embodiment, the first transmitter 1201 includes at least one of the antenna 452, the transmitter 454, the multiantenna transmitting processor 457, the transmitting processor 468, the controller/processor 459, the memory 460 and the data source 467 illustrated in FIG. 4 in the disclosure.

In one embodiment, the first transmitter 1201 includes at least the former five of the antenna 452, the transmitter 454, the multiantenna transmitting processor 457, the transmitting processor 468, the controller/processor 459, the memory 460 and the data source 467 illustrated in FIG. 4 in the disclosure.

In one embodiment, the first transmitter 1201 includes at least the former four of the antenna 452, the transmitter 454, the multiantenna transmitting processor 457, the transmitting processor 468, the controller/processor 459, the memory 460 and the data source 467 illustrated in FIG. 4 in the disclosure.

In one embodiment, the first transmitter 1201 includes at least the former three of the antenna 452, the transmitter 454, the multiantenna transmitting processor 457, the transmitting processor 468, the controller/processor 459, the memory 460 and the data source 467 illustrated in FIG. 4 in the disclosure.

In one embodiment, the first transmitter 1201 includes at least the former two of the antenna 452, the transmitter 454, the multiantenna transmitting processor 457, the transmitting processor 468, the controller/processor 459, the memory 460 and the data source 467 illustrated in FIG. 4 in the disclosure.

In one embodiment, the first receiver 1202 includes at least one of the antenna 452, the receiver 454, the multiantenna receiving processor 458, the receiving processor 456, the controller/processor 469, the memory 460 and the data source 467 illustrated in FIG. 4 in the disclosure.

In one embodiment, the first receiver 1202 includes at least the former five of the antenna 452, the receiver 454, the multiantenna receiving processor 458, the receiving processor 456, the controller/processor 469, the memory 460 and the data source 467 illustrated in FIG. 4 in the disclosure.

In one embodiment, the first receiver 1202 includes at least the former four of the antenna 452, the receiver 454, the multiantenna receiving processor 458, the receiving processor 456, the controller/processor 469, the memory 460 and the data source 467 illustrated in FIG. 4 in the disclosure.

In one embodiment, the first receiver 1202 includes at least the former three of the antenna 452, the receiver 454, the multiantenna receiving processor 458, the receiving processor 456, the controller/processor 469, the memory 460 and the data source 467 illustrated in FIG. 4 in the disclosure.

In one embodiment, the first receiver 1202 includes at least the former two of the antenna 452, the receiver 454, the multiantenna receiving processor 458, the receiving processor 456, the controller/processor 469, the memory 460 and the data source 467 illustrated in FIG. 4 in the disclosure.

The first receiver 1202 receives a first signaling, the first signaling being used for indicating a first time-frequency resource group and the first time-frequency resource group being reserved for a first bit block, and receives a second signaling, the second signaling being used for determining a second time-frequency resource group and the second time-frequency resource group being reserved for a second bit block.

The first transmitter 1201 transmits the first bit block in time-frequency resources in the first time-frequency resource group other than a first resource subgroup, and transmits the second bit block in the second time-frequency resource group.

In Embodiment 10, the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one embodiment, when the first index group and the second index group belong to two index sets among the K index sets respectively, the first resource subgroup includes all time-frequency resources in the first time-frequency resource group that are overlapping with time-frequency resources occupied by the second time-frequency resource group.

In one embodiment, when the first index group and the second index group belong to one same index set among the K index sets, the first resource subgroup includes all time-frequency resources in the first time-frequency resource group that are overlapping in time domain with the second time-frequency resource group.

In one embodiment, time-frequency resources occupied by the first signaling and time-frequency resources occupied by the second signaling belong to two of N time-frequency resource sets respectively, any two of the N time-frequency resource sets are orthogonal, and N is a positive integer greater than 1; or the first signaling is used for determining a first MCS set, the second signaling is used for determining a second MCS set, and a target BLER of the first MCS set is greater than a target BLER of the second MCS set.

In one embodiment, the first receiver 1202 also receives first information, wherein the first information is used for determining the K index sets.

In one embodiment, the first transmitter 1201 also transmits second information, wherein the second information is used for indicating the K.

In one embodiment, the first receiver 1202 also receives a first radio signal; wherein the second signaling is used for determining time-frequency resources occupied by the first radio signal, and the second bit block is related to the first radio signal.

Embodiment 11

Figure 11:
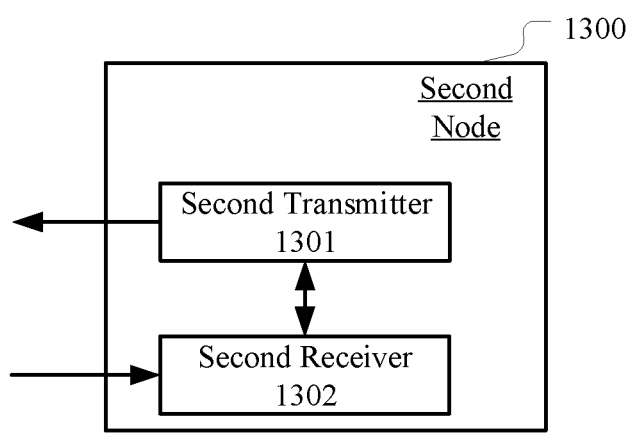
FIG. 11 is a structure block diagram illustrating a processing device in a second node according to one embodiment of the disclosure.

Embodiment 11 illustrates a structure block diagram of a processing device in a second node as shown in FIG. 11. The processing device 1300 in the second node includes a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 includes at least one of the antenna 420, the transmitter 418, the multiantenna transmitting processor 471, the transmitting processor 416, the controller/processor 475 and the memory 476 illustrated in FIG. 4 in the disclosure.

In one embodiment, the second transmitter 1301 includes at least the former five of the antenna 420, the transmitter 418, the multiantenna transmitting processor 471, the transmitting processor 416, the controller/processor 475 and the memory 476 illustrated in FIG. 4 in the disclosure.

In one embodiment, the second transmitter 1301 includes at least the former four of the antenna 420, the transmitter 418, the multiantenna transmitting processor 471, the transmitting processor 416, the controller/processor 475 and the memory 476 illustrated in FIG. 4 in the disclosure.

In one embodiment, the second transmitter 1301 includes at least the former three of the antenna 420, the transmitter 418, the multiantenna transmitting processor 471, the transmitting processor 416, the controller/processor 475 and the memory 476 illustrated in FIG. 4 in the disclosure.

In one embodiment, the second transmitter 1301 includes at least the former two of the antenna 420, the transmitter 418, the multiantenna transmitting processor 471, the transmitting processor 416, the controller/processor 475 and the memory 476 illustrated in FIG. 4 in the disclosure.

In one embodiment, the second receiver 1302 includes at least one of the antenna 420, the receiver 418, the multiantenna receiving processor 472, the receiving processor 470, the controller/processor 475 and the memory 476 illustrated in FIG. 4 in the disclosure.

In one embodiment, the second receiver 1302 includes at least the former five of the antenna 420, the receiver 418, the multiantenna receiving processor 472, the receiving processor 470, the controller/processor 475 and the memory 476 illustrated in FIG. 4 in the disclosure.

In one embodiment, the second receiver 1302 includes at least the former four of the antenna 420, the receiver 418, the multiantenna receiving processor 472, the receiving processor 470, the controller/processor 475 and the memory 476 illustrated in FIG. 4 in the disclosure.

In one embodiment, the second receiver 1302 includes at least the former three of the antenna 420, the receiver 418, the multiantenna receiving processor 472, the receiving processor 470, the controller/processor 475 and the memory 476 illustrated in FIG. 4 in the disclosure.

In one embodiment, the second receiver 1302 includes at least the former two of the antenna 420, the receiver 418, the multiantenna receiving processor 472, the receiving processor 470, the controller/processor 475 and the memory 476 illustrated in FIG. 4 in the disclosure.

The second transmitter 1301 transmits a first signaling, the first signaling being used for indicating a first time-frequency resource group and the first time-frequency resource group being reserved for a first bit block, and transmits a second signaling, the second signaling being used for determining a second time-frequency resource group and the second time-frequency resource group being reserved for a second bit block.

The second receiver 1302 receives the first bit block in time-frequency resources in the first time-frequency resource group other than a first resource subgroup, and receives the second bit block in the second time-frequency resource group.

In Embodiment 11, the first time-frequency resource group and the second time-frequency resource group are partially overlapping, and the first time-frequency resource group includes the first resource subgroup; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group includes a positive integer number of index(es), the second index group includes a positive integer number of index(es), any one of the K index sets includes a positive integer number of index(es), and K is a positive integer greater than 1.

In one embodiment, when the first index group and the second index group belong to two index sets among the K index sets respectively, the first resource subgroup includes all time-frequency resources in the first time-frequency resource group that are overlapping with time-frequency resources occupied by the second time-frequency resource group.

In one embodiment, when the first index group and the second index group belong to one same index set among the K index sets, the first resource subgroup includes all time-frequency resources in the first time-frequency resource group that are overlapping in time domain with the second time-frequency resource group.

In one embodiment, time-frequency resources occupied by the first signaling and time-frequency resources occupied by the second signaling belong to two of N time-frequency resource sets respectively, any two of the N time-frequency resource sets are orthogonal, and N is a positive integer greater than 1; or the first signaling is used for determining a first MCS set, the second signaling is used for determining a second MCS set, and a target BLER of the first MCS set is greater than a target BLER of the second MCS set.

In one embodiment, the second transmitter 1301 also transmits first information, wherein the first information is used for determining the K index sets.

In one embodiment, the second receiver 1302 also receives second information, wherein the second information is used for indicating the K.

In one embodiment, the second transmitter 1301 also transmits a first radio signal; wherein the second signaling is used for determining time-frequency resources occupied by the first radio signal, and the second bit block is related to the first radio signal.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node in the disclosure includes but not limited to mobile phones, tablet computers, notebooks, network cards, low-power equipment, enhanced MTC (eMTC) equipment, NB-IOT equipment, vehicle-mounted communication equipment, aircrafts, airplanes, unmanned aerial vehicles, telecontrolled aircrafts, and other radio communication equipment. The second node in the disclosure includes but not limited to mobile phones, tablet computers, notebooks, network cards, low-power equipment, enhanced MTC (eMTC) equipment, NB-IOT equipment, vehicle-mounted communication equipment, aircrafts, airplanes, unmanned aerial vehicles, telecontrolled aircrafts, and other radio communication equipment. The UE or terminal in the disclosure includes but not limited to mobile phones, tablet computers, notebooks, network cards, low-power equipment, enhanced MTC (eMTC) equipment, NB-IOT equipment, vehicle-mounted communication equipment, aircrafts, airplanes, unmanned aerial vehicles, telecontrolled aircrafts, and other radio communication equipment. The base station equipment or base station or network side equipment in the disclosure includes but not limited to macro-cellular base stations, micro-cellular base stations, home base stations, relay base stations, eNBs, gNBs, TRPs, GNSS, relay satellites, satellite base stations, air base stations and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:
1. A first node for wireless communication, comprising:
a first receiver, to receive a first signaling, the first signaling being used for indicating a first time-frequency resource group, the first time-frequency resource group is time-frequency resources allocated to a Physical Uplink Shared Channel (PUSCH), the first time-frequency resource group includes a positive integer number of Resource Elements (REs), and the first time-frequency resource group being reserved for a first bit block, the first bit block includes one Transport Block (TB); and to receive a second signaling, the second signaling being used for determining a second time-frequency resource group, the second time-frequency resource group includes a positive integer number of REs, and the second time-frequency resource group being reserved for a second bit block; the second time-frequency resource group is time-frequency resources allocated to a PUSCH, the second bit block includes one TB, or, the second time-frequency resource group is time-frequency resources allocated to a Physical Uplink Control CHannel (PUCCH), the second bit block includes Uplink Control Information (UCI), the UCI includes a Hybrid Automatic Repeat reQuest ACKnowledgement (HARQ-ACK), or the UCI includes Channel State Information (CSI), or the UCI includes at least one of a HARQ-ACK and a CSI; and
a first transmitter, to transmit the first bit block in time-frequency resources in the first time-frequency resource group other than a first resource subgroup, and to transmit the second bit block in the second time-frequency resource group; the first resource subgroup includes a positive integer number of RE(s);
wherein the first time-frequency resource group and the second time-frequency resource group are partially overlapping, and the first time-frequency resource group comprises the first resource subgroup; time-frequency resources in the first time-frequency resource group other than the first resource subgroup are orthogonal to time-frequency resources occupied by the second time-frequency resource group; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group comprises a positive integer number of index(es), the second index group comprises a positive integer number of index(es), any one of the K index sets comprises a positive integer number of index(es), and K is a positive integer greater than 1.

2. The first node according to claim 1, wherein when the first index group and the second index group belong to two index sets among the K index sets respectively, the first resource subgroup comprises all time-frequency resources in the first time-frequency resource group that are overlapping with time-frequency resources occupied by the second time-frequency resource group.

3. The first node according to claim 1, wherein when the first index group and the second index group belong to one same index set among the K index sets, the first resource subgroup comprises all time-frequency resources in the first time-frequency resource group that are overlapping in time domain with the second time-frequency resource group.

4. The first node according to claim 1, wherein time-frequency resources occupied by the first signaling and time-frequency resources occupied by the second signaling belong to two of N time-frequency resource sets respectively, the N time-frequency resource sets include N COntrol-REsource SETs (CORESETs) respectively, or the N time-frequency resource sets include N search spaces respectively, or the N time-frequency resource sets include N PDCCH candidates respectively;
- or, the first signaling carries a first identifier, the second signaling carries a second identifier, the first identifier and the second identifier are two different non-negative integers respectively;
- or, the first signaling is used for determining a first Modulation and Coding Scheme (MCS) set, the second signaling is used for determining a second MCS set, and a target Block Error Rate (BLER) of the first MCS set is greater than a target BLER of the second MCS set.

5. The first node according to claim 1, wherein any one index in the first index group is an index of a first-type reference signal, any one index in the second index group is an index of a first-type reference signal, and any one index in the K index sets is an index of a first-type reference signal; the first-type reference signal includes an uplink reference signal, or the first-type reference signal includes a downlink reference signal, or the first-type reference signal includes at least one of an uplink reference signal and a downlink reference signal;
- or, the first index group includes one index only, the second index group includes one index only, and any one of the K index sets includes one index only;
- or, the K index sets are K reference signal set indexes respectively, the first index group is one of the K reference signal set indexes, the second index group is one of the K reference signal set indexes, and any one of the K reference signal sets includes at least one of a downlink reference signal or an uplink reference signal.

6. A second node for wireless communication, comprising:
- a second transmitter, to transmit a first signaling, the first signaling being used for indicating a first time-frequency resource group, the first time-frequency resource group is time-frequency resources allocated to a Physical Uplink Shared Channel (PUSCH), the first time-frequency resource group includes a positive integer number of Resource Elements (REs), and the first time-frequency resource group being reserved for a first bit block, the first bit block includes one Transport Block (TB); and to transmit a second signaling, the second signaling being used for determining a second time-frequency resource group, the second time-frequency resource group includes a positive integer number of REs, and the second time-frequency resource group being reserved for a second bit block; the second time-frequency resource group is time-frequency resources allocated to a PUSCH, the second bit block includes one TB, or, the second time-frequency resource group is time-frequency resources allocated to a Physical Uplink Control CHannel (PUCCH), the second bit block includes Uplink Control Information (UCI), the UCI includes a Hybrid Automatic Repeat reQuest ACKnowledgement (HARQ-ACK), or the UCI includes Channel State Information (CSI), or the UCI includes at least one of a HARQ-ACK and a CSI; and
- a second receiver, to receive the first bit block in time-frequency resources in the first time-frequency resource group other than a first resource subgroup, and to receive the second bit block in the second time-frequency resource group; the first resource subgroup includes a positive integer number of RE(s);
- wherein the first time-frequency resource group and the second time-frequency resource group are partially overlapping, and the first time-frequency resource group comprises the first resource subgroup; time-frequency resources in the first time-frequency resource group other than the first resource subgroup are orthogonal to time-frequency resources occupied by the second time-frequency resource group; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group comprises a positive integer number of index(es), the second index group comprises a positive integer number of index(es), any one of the K index sets comprises a positive integer number of index(es), and K is a positive integer greater than 1.

7. The second node according to claim 6, wherein when the first index group and the second index group belong to two index sets among the K index sets respectively, the first resource subgroup comprises all time-frequency resources in the first time-frequency resource group that are overlapping with time-frequency resources occupied by the second time-frequency resource group.

8. The second node according to claim 6, wherein when the first index group and the second index group belong to one same index set among the K index sets, the first resource subgroup comprises all time-frequency resources in the first time-frequency resource group that are overlapping in time domain with the second time-frequency resource group.

9. The second node according to claim 6, wherein time-frequency resources occupied by the first signaling and time-frequency resources occupied by the second signaling belong to two of N time-frequency resource sets respectively, the N time-frequency resource sets include N COntrol-REsource SETs (CORESETs) respectively, or the N time-frequency resource sets include N search spaces respectively, or the N time-frequency resource sets include N PDCCH candidates respectively;

or, the first signaling carries a first identifier, the second signaling carries a second identifier, the first identifier and the second identifier are two different non-negative integers respectively;

or, the first signaling is used for determining a first Modulation and Coding Scheme (MCS) set, the second signaling is used for determining a second MCS set, and a target Block Error Rate (BLER) of the first MCS set is greater than a target BLER of the second MCS set.

10. The second node according to claim 6, wherein any one index in the first index group is an index of a first-type reference signal, any one index in the second index group is an index of a first-type reference signal, and any one index in the K index sets is an index of a first-type reference signal; the first-type reference signal includes an uplink reference signal, or the first-type reference signal includes a downlink reference signal, or the first-type reference signal includes at least one of an uplink reference signal and a downlink reference signal;

or, the first index group includes one index only, the second index group includes one index only, and any one of the K index sets includes one index only;

or, the K index sets are K reference signal set indexes respectively, the first index group is one of the K reference signal set indexes, the second index group is one of the K reference signal set indexes, and any one of the K reference signal sets includes at least one of a downlink reference signal or an uplink reference signal.

11. A method in a first node for wireless communication, comprising:

receiving a first signaling, the first signaling being used for indicating a first time-frequency resource group, the first time-frequency resource group is time-frequency resources allocated to a Physical Uplink Shared Channel (PUSCH), the first time-frequency resource group includes a positive integer number of Resource Elements (REs), and the first time-frequency resource group being reserved for a first bit block, the first bit block includes one Transport Block (TB);

receiving a second signaling, the second signaling being used for determining a second time-frequency resource group, the second time-frequency resource group includes a positive integer number of REs, and the second time-frequency resource group being reserved for a second bit block; the second time-frequency resource group is time-frequency resources allocated to a PUSCH, the second bit block includes one TB, or, the second time-frequency resource group is time-frequency resources allocated to a Physical Uplink Control CHannel (PUCCH), the second bit block includes Uplink Control Information (UCI), the UCI includes a Hybrid Automatic Repeat reQuest ACKnowledgement (HARQ-ACK), or the UCI includes Channel State Information (CSI), or the UCI includes at least one of a HARQ-ACK and a CSI; and transmitting the first bit block in time-frequency resources in the first time-frequency resource group other than a first resource subgroup; the first resource subgroup includes a positive integer number of RE(s); and transmitting the second bit block in the second time-frequency resource group;

wherein the first time-frequency resource group and the second time-frequency resource group are partially overlapping, and the first time-frequency resource group comprises the first resource subgroup; time-frequency resources in the first time-frequency resource group other than the first resource subgroup are orthogonal to time-frequency resources occupied by the second time-frequency resource group; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group comprises a positive integer number of index(es), the second index group comprises a positive integer number of index(es), any one of the K index sets comprises a positive integer number of index(es), and K is a positive integer greater than 1.

12. The method according to claim 11, wherein when the first index group and the second index group belong to two index sets among the K index sets respectively, the first resource subgroup comprises all time-frequency resources in the first time-frequency resource group that are overlapping with time-frequency resources occupied by the second time-frequency resource group.

13. The method according to claim 11, wherein when the first index group and the second index group belong to one same index set among the K index sets, the first resource subgroup comprises all time-frequency resources in the first time-frequency resource group that are overlapping in time domain with the second time-frequency resource group.

14. The method according to claim 11, wherein time-frequency resources occupied by the first signaling and time-frequency resources occupied by the second signaling belong to two of N time-frequency resource sets respectively, the N time-frequency resource sets include N COntrol-REsource SETs (CORESETs) respectively, or the N time-frequency resource sets include N search spaces respectively, or the N time-frequency resource sets include N PDCCH candidates respectively;

or, the first signaling is used for determining a first Modulation and Coding Scheme (MCS) set, the second signaling is used for determining a second MCS set, and a target Block Error Rate (BLER) of the first MCS set is greater than a target BLER of the second MCS set.

15. The method according to claim 11, wherein any one index in the first index group is an index of a first-type reference signal, any one index in the second index group is an index of a first-type reference signal, and any one index in the K index sets is an index of a first-type reference signal;

the first-type reference signal includes an uplink reference signal, or the first-type reference signal includes a downlink reference signal, or the first-type reference signal includes at least one of an uplink reference signal and a downlink reference signal;

or, the first index group includes one index only, the second index group includes one index only, and any one of the K index sets includes one index only;

or, the K index sets are K reference signal set indexes respectively, the first index group is one of the K reference signal set indexes, the second index group is one of the K reference signal set indexes, and any one of the K reference signal sets includes at least one of a downlink reference signal or an uplink reference signal.

16. A method in a second node for wireless communication, comprising:
- transmitting a first signaling, the first signaling being used for indicating a first time-frequency resource group, the first time-frequency resource group is time-frequency resources allocated to a Physical Uplink Shared Channel (PUSCH), the first time-frequency resource group includes a positive integer number of Resource Elements (REs), and the first time-frequency resource group being reserved for a first bit block, the first bit block includes one Transport Block (TB);
- transmitting a second signaling, the second signaling being used for determining a second time-frequency resource group, the second time-frequency resource group includes a positive integer number of REs, and the second time-frequency resource group being reserved for a second bit block; the second time-frequency resource group is time-frequency resources allocated to a PUSCH, the second bit block includes one TB, or, the second time-frequency resource group is time-frequency resources allocated to a Physical Uplink Control CHannel (PUCCH), the second bit block includes Uplink Control Information (UCI), the UCI includes a Hybrid Automatic Repeat reQuest ACKnowledgement (HARQ-ACK), or the UCI includes Channel State Information (CSI), or the UCI includes at least one of a HARQ-ACK and a CSI;
- receiving the first bit block in time-frequency resources in the first time-frequency resource group other than a first resource subgroup, the first resource subgroup includes a positive integer number of RE(s); and
- receiving the second bit block in the second time-frequency resource group;
- wherein the first time-frequency resource group and the second time-frequency resource group are partially overlapping, and the first time-frequency resource group comprises the first resource subgroup; time-frequency resources in the first time-frequency resource group other than the first resource subgroup are orthogonal to time-frequency resources occupied by the second time-frequency resource group; the first signaling is used for determining a first index group, and the second signaling is used for determining a second index group; the first index group belongs to one of K index sets, the second index group belongs to one of K index sets, and any two of the K index sets are different; whether the first index group and the second index group belong to one same index set among the K index sets is used for determining the first resource subgroup; the first index group comprises a positive integer number of index(es), the second index group comprises a positive integer number of index(es), any one of the K index sets comprises a positive integer number of index(es), and K is a positive integer greater than 1.

17. The method according to claim 16, wherein when the first index group and the second index group belong to two index sets among the K index sets respectively, the first resource subgroup comprises all time-frequency resources in the first time-frequency resource group that are overlapping with time-frequency resources occupied by the second time-frequency resource group.

18. The method according to claim 16, wherein when the first index group and the second index group belong to one same index set among the K index sets, the first resource subgroup comprises all time-frequency resources in the first time-frequency resource group that are overlapping in time domain with the second time-frequency resource group.

19. The method according to claim 16, wherein time-frequency resources occupied by the first signaling and time-frequency resources occupied by the second signaling belong to two of N time-frequency resource sets respectively, the N time-frequency resource sets include N COntrol-REsource SETs (CORESETs) respectively, or the N time-frequency resource sets include N search spaces respectively, or the N time-frequency resource sets include N PDCCH candidates respectively;
- or, the first signaling carries a first identifier, the second signaling carries a second identifier, the first identifier and the second identifier are two different non-negative integers respectively;
- or, the first signaling is used for determining a first Modulation and Coding Scheme (MCS) set, the second signaling is used for determining a second MCS set, and a target Block Error Rate (BLER) of the first MCS set is greater than a target BLER of the second MCS set.

20. The method according to claim 16, wherein any one index in the first index group is an index of a first-type reference signal, any one index in the second index group is an index of a first-type reference signal, and any one index in the K index sets is an index of a first-type reference signal; the first-type reference signal includes an uplink reference signal, or the first-type reference signal includes a downlink reference signal, or the first-type reference signal includes at least one of an uplink reference signal and a downlink reference signal;
- or, the first index group includes one index only, the second index group includes one index only, and any one of the K index sets includes one index only;
- or, the K index sets are K reference signal set indexes respectively, the first index group is one of the K reference signal set indexes, the second index group is one of the K reference signal set indexes, and any one of the K reference signal sets includes at least one of a downlink reference signal or an uplink reference signal.

* * * * *